(12) United States Patent
Ackerman et al.

(10) Patent No.: US 11,497,243 B2
(45) Date of Patent: Nov. 15, 2022

(54) STORAGE DEVICES AND MONITORING SYSTEMS FOR PLANT PRODUCTS AND METHODS FOR USING SAME

(71) Applicant: Uniti Cannabis Ltd., Tel Aviv (IL)

(72) Inventors: Omer Ackerman, Ramot Hashavim (IL); Daniel Narunsky, Tel Aviv Yafo (IL)

(73) Assignee: Uniti Smart Ltd., Tel Aviv (IL)

( * ) Notice: Subject to any disclaimer, the term of this patent is extended or adjusted under 35 U.S.C. 154(b) by 0 days.

(21) Appl. No.: 17/143,621

(22) Filed: Jan. 7, 2021

(65) Prior Publication Data

US 2021/0212361 A1    Jul. 15, 2021

Related U.S. Application Data

(63) Continuation-in-part of application No. 29/730,665, filed on Apr. 7, 2020.

(60) Provisional application No. 62/959,288, filed on Jan. 10, 2020.

(51) Int. Cl.
*A24F 23/00* (2006.01)
*B65D 81/18* (2006.01)
*G01G 15/04* (2006.01)

(52) U.S. Cl.
CPC .............. *A24F 23/00* (2013.01); *B65D 81/18* (2013.01); *G01G 15/04* (2013.01)

(58) Field of Classification Search
CPC .......... A24F 23/00; B65D 81/18; G01G 15/04
USPC ................ 206/242; 220/23.87, 23.88, 573.4, 220/495.05
See application file for complete search history.

(56) References Cited

U.S. PATENT DOCUMENTS

| 10,773,867 | B1* | 9/2020 | Shah | B65D 55/02 |
|---|---|---|---|---|
| 2017/0137201 | A1* | 5/2017 | Jackson | B65D 25/04 |
| 2017/0190482 | A1* | 7/2017 | Smith | B65D 51/1683 |
| 2019/0232253 | A1* | 8/2019 | Lindars | A24F 40/42 |
| 2019/0248555 | A1* | 8/2019 | Cabouli | G07C 9/00563 |

(Continued)

FOREIGN PATENT DOCUMENTS

| EP | 0103857 A1 | 3/1984 |
|---|---|---|
| EP | 1856992 A1 | 11/2007 |

(Continued)

OTHER PUBLICATIONS

European Patent Office, Extended Search Report issued in EP 21151034.2 dated Jun. 4, 2021.

*Primary Examiner* — Jacob K Ackun
(74) *Attorney, Agent, or Firm* — Wood Herron & Evans LLP

(57) ABSTRACT

A storage device for storing perishable plant matter and a system for monitoring and accessing the device and plant matter. A storage device for storing a plant product includes a housing. The housing has a sidewall that defines an opening and a lid coupled to the sidewall and movable to a closed position in which the opening is closed off. The lid, in cooperation with the sidewall, defines a storage space in the housing wherein at least one container that receives the plant product and may be removably received. A storage and monitoring system includes a locking mechanism, at least one scale, and a relative humidity sensor, and an app operable on a mobile device and configured to operate and monitor the storage device. The app is configured to operate the locking mechanism.

24 Claims, 20 Drawing Sheets

(56) References Cited

U.S. PATENT DOCUMENTS

| | | | | |
|---|---|---|---|---|
| 2019/0367233 A1* | 12/2019 | Cabouli | ............ | G07C 9/00912 |
| 2020/0071029 A1* | 3/2020 | Smith | ................ | A47F 3/145 |
| 2020/0108977 A1* | 4/2020 | Lumia | ................ | B65D 45/327 |
| 2020/0113353 A1* | 4/2020 | Bigioni | ................ | A47F 3/145 |
| 2020/0158359 A1* | 5/2020 | Ratchford | ............ | A24F 25/00 |
| 2020/0189808 A1* | 6/2020 | Bilinski | ............ | G07C 9/00896 |
| 2020/0247592 A1* | 8/2020 | Kantati | ............ | B65D 50/04 |
| 2021/0039848 A1* | 2/2021 | Kachian | ................ | B65D 5/38 |
| 2021/0086968 A1* | 3/2021 | Havilio | ................ | H04W 4/80 |
| 2021/0316907 A1* | 10/2021 | Tidwell | ................ | B65D 41/06 |
| 2022/0002064 A1* | 1/2022 | Carlos-Wallace | ............ | B65D 81/2038 |
| 2022/0040421 A1* | 2/2022 | Eyal | ................ | A61M 15/0021 |

FOREIGN PATENT DOCUMENTS

| | | |
|---|---|---|
| WO | 2016188690 A1 | 12/2016 |
| WO | 2016193808 A1 | 12/2016 |

* cited by examiner

STORAGE DEVICES AND MONITORING SYSTEMS FOR PLANT PRODUCTS AND METHODS FOR USING SAME

CROSS-REFERENCE TO RELATED APPLICATIONS

This application claims priority to U.S. Provisional Patent Application No. 62/959,288, filed Jan. 10, 2020, and to U.S. Design Application No. 29/730,665, filed on Apr. 7, 2020, the entire contents of each of which is incorporated herein by reference.

TECHNICAL FIELD

Embodiments of the invention relate generally to devices for storing plant products in controlled environments and systems and methods for using those devices and, more particularly, to devices and systems for storing and monitoring regulated plant products.

BACKGROUND

Pharmaceutical and recreational plant products are usually purchased in a quantity larger than is consumed during any single use. For example, each of cannabis (a.k.a., pot or marijuana) and tobacco is a plant product. Once purchased, the initial quantity is reduced through periodic consumption. The initial, purchased quantity and any residual portion remaining after consumption should be stored in a safe location. At the time of purchase, these plant products are fresh but, because they are organic, they are perishable. That is, they decay. Over time they may lose inherent properties that are important to the consumer.

The rate of decay can be largely influenced by the storage environment. At an extreme, if improperly stored, the rate of decay may be high. A fresh plant product that decays rapidly may become unusable after a few days. In such case, mold may grow on the product rendering it unusable. At a slower rate of decay, the freshness of the product gradually fades so that if not consumed quickly enough, the product loses its desirable properties, such as flavor and entourage effect. While decay is inevitable, storage of such products plays a significant role in slowing the rate of decay and thereby maintaining desirable product qualities until the product is consumed. Advantageously, in a proper storage environment, larger quantities may be purchased and stored with a lesser concern as to long-term quality.

Perishability aside, purchase, storage, and use of these plant products can be complicated by government regulations. For example, there are legal and regulatory frameworks surrounding all aspects of cannabis, from production to personal storage and consumption. Government regulations also apply to tobacco. For cannabis, some state laws seek to regulate the location of stored cannabis at a person's residence. These regulations often require a locked and hidden residential storage location. So, not only is the perishability of plant products of importance to the consumer, the residential storage and consumption be compliant with state and federal regulations.

While storage devices for plant products have had some success in addressing these issues, there remains a need to improve the storage of plant products, such as cannabis, to facilitate long-term medical treatment or recreational use while abiding by all governmental regulations.

SUMMARY

To these and other ends, the present invention is directed to a storage device for storing perishable plant matter and a system for monitoring and accessing the device and plant matter. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the invention, a storage device for storing a plant product comprises a housing, wherein the housing has a sidewall that defines an opening and a lid coupled to the sidewall. The lid is movable to a closed position in which the opening is closed off. The lid, in cooperation with the sidewall, defines a storage space in the housing wherein at least one container that receives the plant product and is removably received.

In one embodiment, the container is open to the storage space of the storage device.

In one embodiment, the container comprises a body and a lid that can be removably detached from the body, wherein the lid comprises an opening through which the plant product is inserted into the container. In a further embodiment thereof, the opening in the lid is shaped like a funnel that projects into the container.

In one embodiment, the storage device further comprises a fan for circulating air in the storage device. In a further embodiment, a partition wall is located in the storage device and separates the storage space from an internal compartment where the fan is located. The partition wall comprises at least one inlet port and at least one outlet port.

In one embodiment, the fan is configured to circulate air from the storage space through the at least one inlet port and out of the at least one outlet port.

In one embodiment, the number of exhaust ports equals the number of containers.

In one embodiment, the storage device further comprises a partition wall, wherein the partition wall comprises at least one inlet port and at least one exhaust port.

In one embodiment, an exhaust port is positioned to direct airflow into an opening of one container. In one embodiment, at least one exhaust port extends into the opening of the container when the storage device lid is closed.

In one embodiment, the storage device comprises a humidity regulation device.

In one embodiment, the storage device comprises a humidity regulation device substance in the storage space.

In one embodiment, the storage device comprises a humidity regulation device or a humidity regulation device substance between the at least one inlet and fan in the compartment formed by the partition wall.

In one embodiment, the storage device further comprises at least one scale, wherein a container rests on the scale when the lid is in the closed position. In a further embodiment thereof, each scale has a shape matching a push-up of a base of only one container. In this embodiment, the scale and the push-up form a male-female connection. In a yet further embodiment, the base of each container has a shape that matches the shape of the push-up or the shape of the scale.

In one embodiment, the storage device further comprises a relative humidity sensor in the storage space for measuring the relative humidity when the lid is in the closed position.

In one embodiment, the storage device further comprises a lock mechanism selectively operable to lock the lid in the closed position.

In one embodiment, each container rests on one scale when the lid is in the closed position, and a relative humidity sensor is located in the storage space and used for measuring relative humidity when the lid is in the closed position.

In one embodiment, the storage device further comprises a relative temperature sensor.

In one embodiment, the storage device further comprises a motion detector.

In one embodiment, the storage device further comprises a location sensor (e.g. GPS).

In one embodiment, the storage device further comprises a gyroscopic sensor. The gyroscopic sensor may be used to determine an orientation of the plant product or the relative level of the storage device. The relative level may be used to calculate a more accurate weight of the plant product, alert a user to level the device before taking a weight measurement, or disregard a weight measurement taken while the storage device is not level.

In accordance with the principles of the invention, a storage and monitoring system comprises the storage device and an app operable on a mobile device and configured to operate and monitor the storage device, wherein the app is configured to operate the locking mechanism.

In one embodiment, the storage and monitoring system app is configured to indicate a relative humidity measurement from the relative humidity sensor.

In one embodiment, the storage and monitoring system app is configured to indicate a mass of the plant product in the at least one container.

In one embodiment, the storage and monitoring system app is configured to indicate a relative temperature measurement from a relative temperature sensor.

In one embodiment, the storage and monitoring system app is configured to indicate a relative movement of the storage device from a motion sensor.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

DETAILED DESCRIPTION

Figure 1:
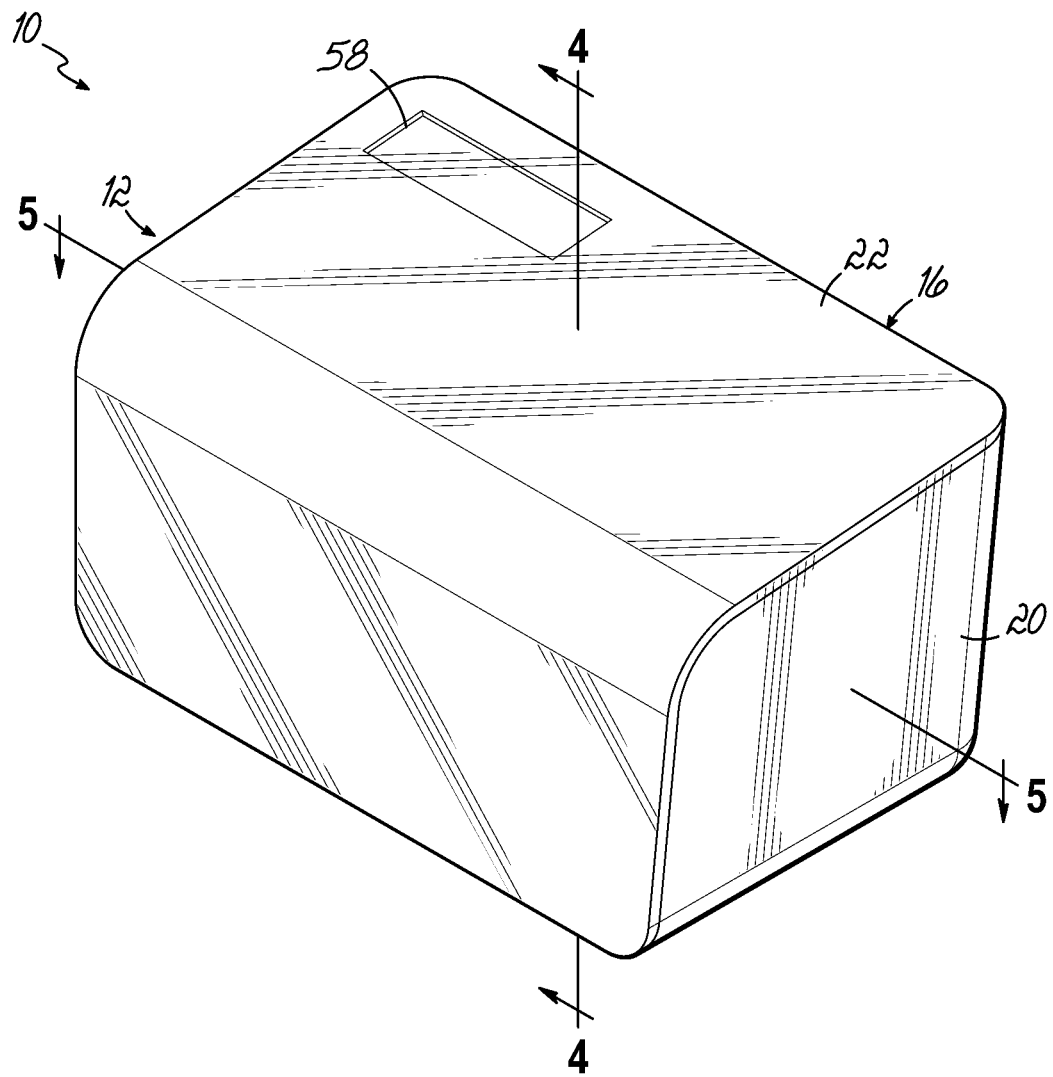
FIG. 1 is a perspective view of a storage device according to one embodiment of the invention.
Figure 2:
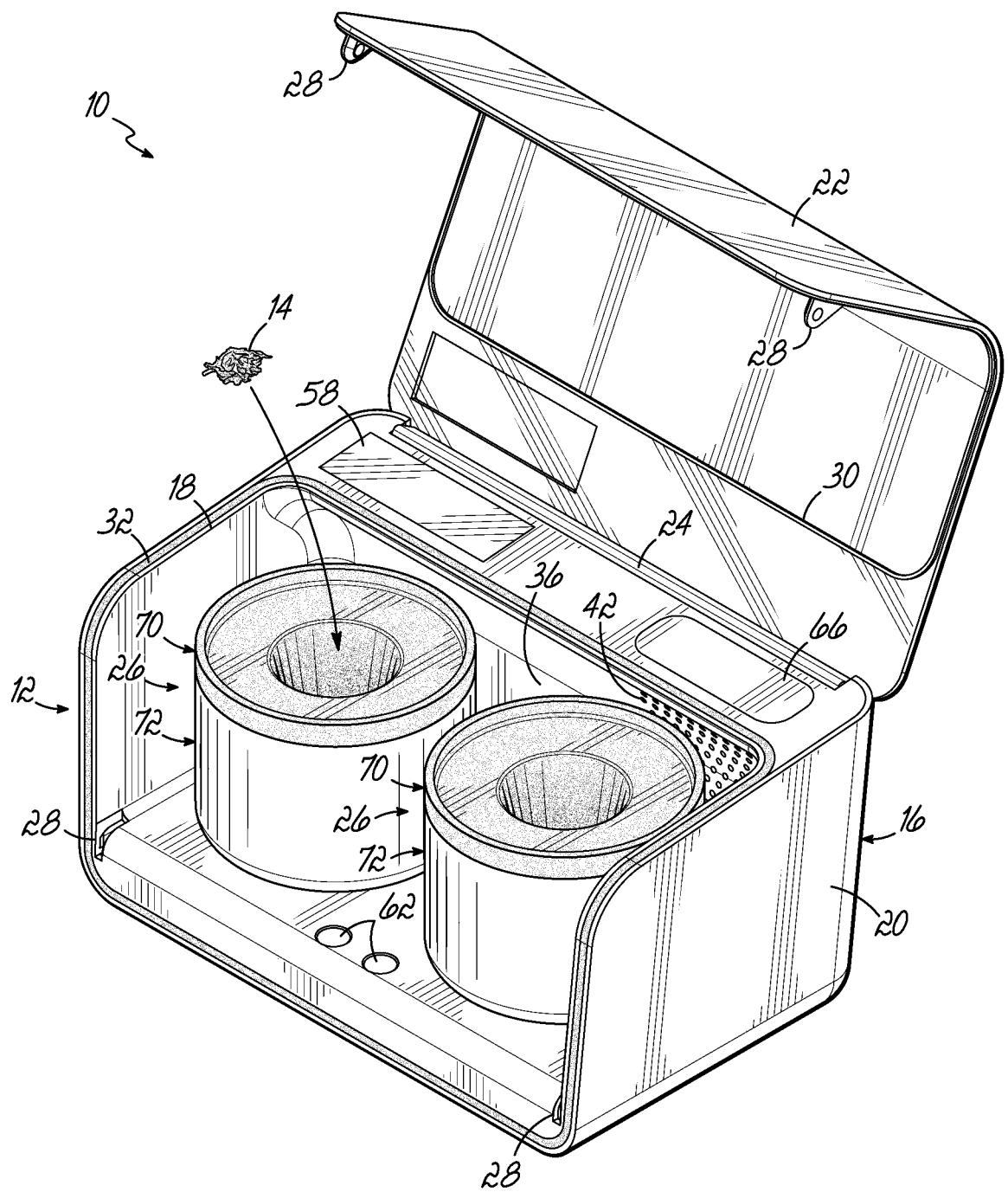
FIG. 2 is a perspective view of the storage device of FIG. 1 shown opened.
Figure 3:
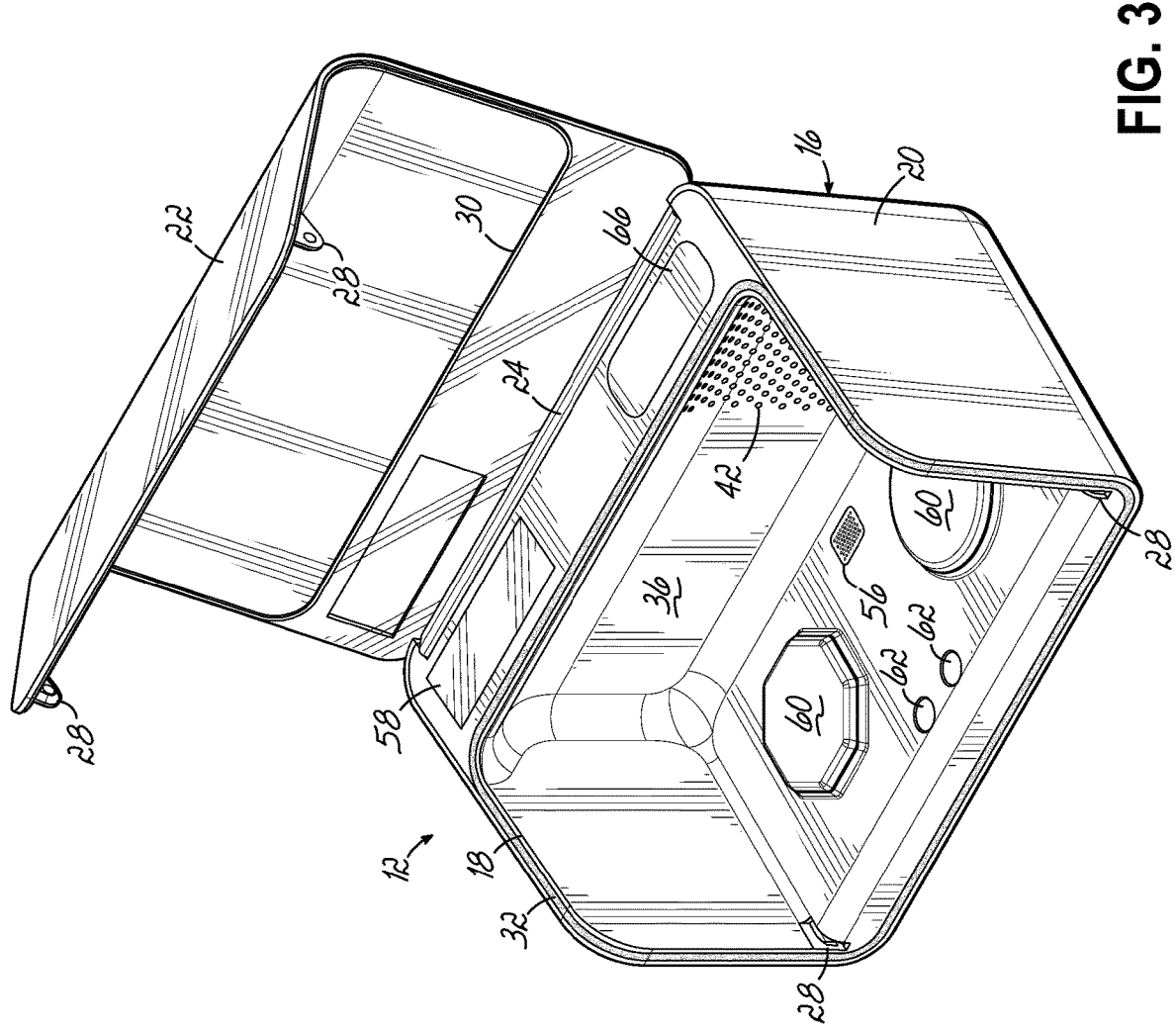
FIG. 3 is a front perspective view of the storage device with internal containers shown removed.
Figure 3:
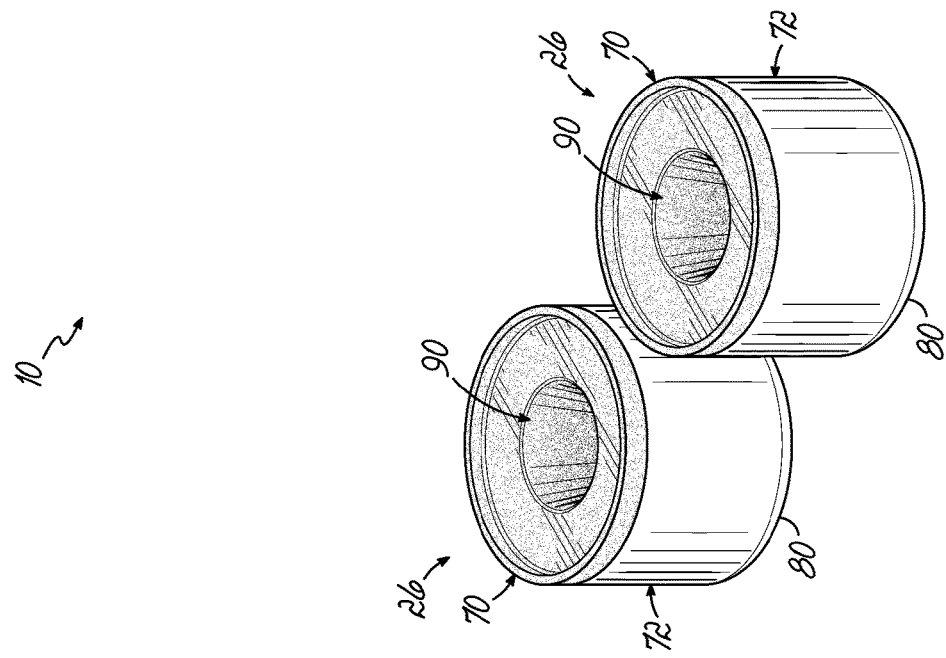

To those and other ends and with reference to the figures generally and to FIGS. 1 and 2 in particular, a storage and monitoring system 10 (shown in FIG. 10) includes a storage device 12 for storage of a perishable product 14 (FIG. 2), such as a plant product. The storage and monitoring system 10 may be used with dried plant products, particularly cured cannabis flowers/buds. While specific reference is made to cannabis products herein, the storage and monitoring system 10 has applicability to storage of other perishable plant products. Tobacco is another example of a plant product usable with the storage device 12. Embodiments of the invention are not therefore limited to use with cured cannabis products. Further, the storage and monitoring system 10 may be incorporated into an internet of things, as is described below. Although described as a portion of the system 10, the storage device 12 may also be utilized as a stand-alone device to secure and monitor use of the product 14 stored in it.

Referring to FIGS. 1 and 2, a consumer of the perishable product 14 may purchase and then store their product 14 in the storage device 12. The consumer may then monitor the device 12 and their use of the product 14 via the system 10 as is described below in conjunction with FIGS. 10-13G. During storage, the storage device 12 reduces a rate of decay of the perishable product 14 while also securing the product 14 against unauthorized use. That is, the storage device 12 is lockable.

In that regard, the storage device 12 has a housing 16 including a sidewall 20 that defines an opening 18 (FIG. 2) and a lid 22 that is selectively lockable in the opening 18 in a closed position shown in FIG. 1. The housing 16 may be made of a material that blocks sunlight and may only block UV light so that any plant product 14 stored in the storage device 12 is not exposed to UV light when the lid 22 is closed. Although not shown, when the lid 22 is opened, one or more lights (e.g., LEDs) inside the housing 16 may turn on to enhance the visibility of the containers 26 and interior of the housing 16. In one embodiment, neither the lid 22 nor the sidewall 20 includes any penetrations or other features that permit light to enter the housing 16 when the lid 22 is closed. In the exemplary embodiment, when unlocked, the lid 22 is movable about a hinge 24 to an opened position in which the consumer can then access their product 14 stored in the device 12 through the opening 18. As shown, the product 14 is storable in one or more individual containers 26 removably contained within the housing 16. Although containers 26 are shown removable from the housing 16, the containers may be secured within the housing 16 and so may not be removable. The purpose and function of the containers 26 is described below with reference to FIGS. 7-9B.

The storage device 12 is lockable via a lock mechanism 28 that is operable to prevent the lid 22 from being opened when the lid 22 is in the closed position. The lock mechanism 28 may be in electrical communication with a printed circuit board (PCB) (not shown) through which the consumer can operate the lock mechanism 28 either while in close proximity to the storage device 12 through a user interface (not shown) on the housing 16 or when the consumer is located remotely from the device 12 through a cell phone or similar mobile device.

In the exemplary embodiment shown, the lock mechanism 28 includes a receptable on the lid 22 which selectively receives a projection housed in the sidewall 20 when the lid 22 is in the closed position and the consumer toggles the lock mechanism 28 to an engaged position. Embodiments of the invention are not limited to the type and arrangement of the components of the lock mechanism 28 shown. For example, the receptacle and the projection may be reversed. Once engaged, the lock mechanism 28 secures the lid 22 in the closed position. The lock mechanism 28 may only be disengaged by the consumer or another authorized user.

The storage device 12 also includes systems to reduce the rate at which the product 14 decays and to reduce or eliminate the possibility of mold formation on the product 14. To that end, the housing 16 is sealable against infiltration of air from external to the housing 16 when the lid 22 is closed. By way of example, the lid 22 may include a seal member 30 that engages a seal ring 32 (e.g., an O-ring) that traces the opening 18 in the sidewall 20. When closed, the seal member 30 on the lid 22 and the seal ring 32 on the sidewall 20 form an impermeable seal. Once sealed, the housing 16 includes a sealed storage space 34, shown best in FIG. 4. The ambient environment in the sealed storage space 34 is controllable and so may differ from the natural environment outside of the storage device 12. That is, air movement between the sealed storage space 34 and the air outside of the storage device 12 is prevented. The sealed storage space 34 encompasses the containers 26 and the plant product 14 and may include additional compartments within the housing 16. When present, the additional compartments may house components that provide additional functionality to the device 12 and system 10.

Figure 4:
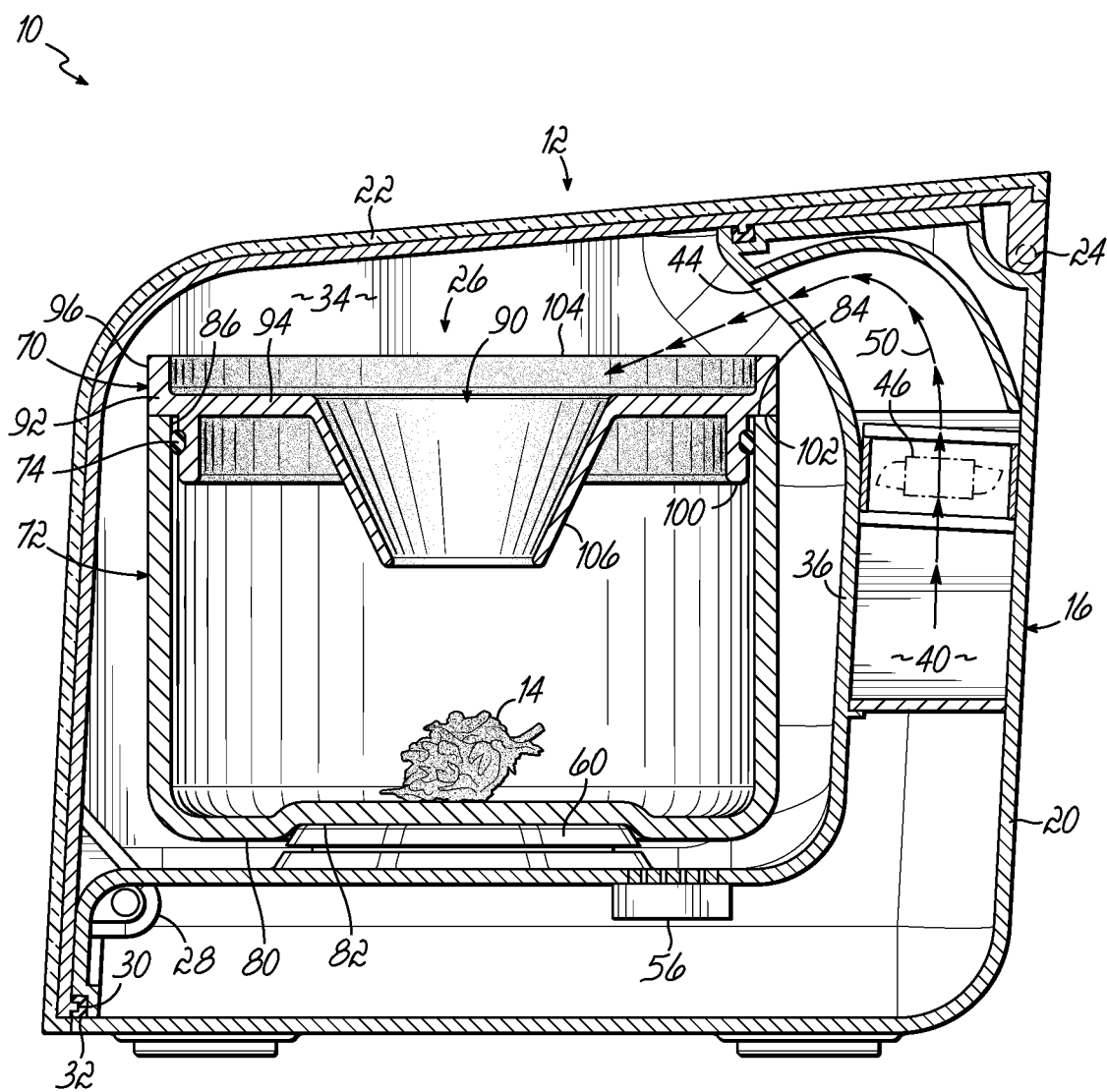
FIG. 4 is a schematic cross-sectional view illustrating exemplary air flow of the storage device of FIG. 1 taken along section line 4-4.
Figure 5:
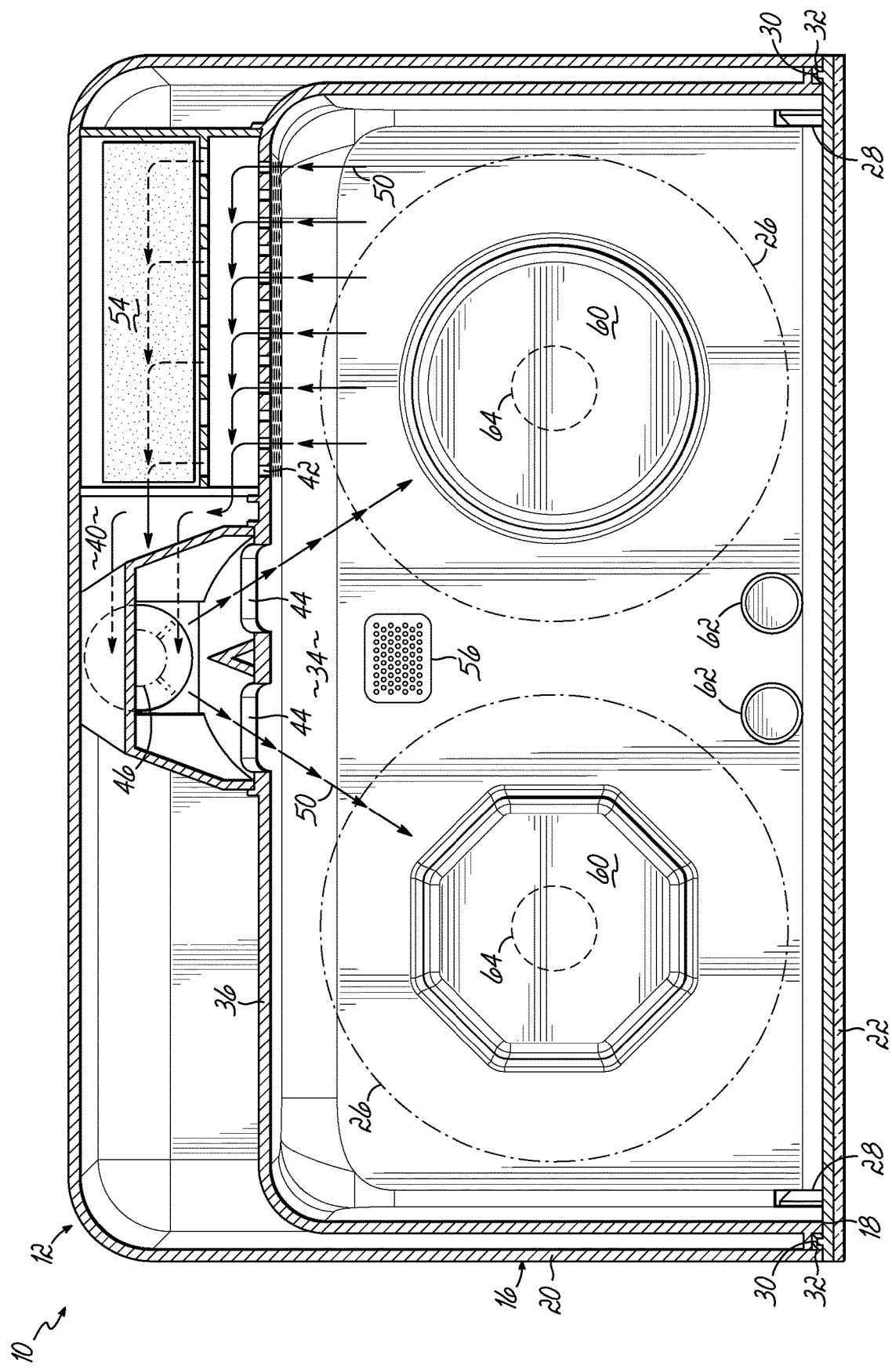
FIG. 5 is a schematic cross-sectional view further illustrating exemplary air flow of the storage device of FIG. 1 taken along section line 5-5.

As an example only, and with reference to FIGS. 4 and 5, an L-shaped partition wall 36 may separate the storage space 34 from a compartment 40. The partition wall 36 includes at least one inlet port 42 and at least one exhaust port 44. The number of the exhaust ports 44 may equal the number of containers 26. Further, the location of individual exhaust ports 44 may depend on the location of a respective one of the containers 26. In the embodiment shown, the inlet port 42 is a grating along a vertical portion of the partition wall 36. The storage space 34 is in fluid communication with the compartment 40 via ports 42, 44. In one embodiment, a fan 46 is housed in the compartment 40 and may be mounted proximate one of the ports 42, 44. In the embodiment shown in FIGS. 4 and 5, the fan 46 is secured to the vertical portion of the partition wall 36 in the compartment 40 and is adjacent the grating 42. When energized, the fan 46 circulates air through the storage space 34 by way of ports 42, 44 as is shown by way of a plurality of arrows 50 in FIGS. 5 and 8. As shown, the at least one port 44 is located to direct air toward the containers 26. This facilitates air circulation inside the container 26, as is described below with reference to FIG. 8. The fan 46 may be operated continuously when the lid 22 is closed to circulate the captured air in the storage space 34 and the compartment 40 into and around containers 26 in which the product 14 is stored. The fan 46 may also operate non-continuously and for determined periods of time according to an algorithm.

In one embodiment, the relative humidity level in the storage space 34 is controlled to eliminate the possibility of mold growth on the plant product 14. By way of example, a humidity regulation pack 54 may be housed in the compartment 40. The pack 54 includes a substance that helps control the relative humidity in the air by adding moisture (e.g., via a humectant) or removing moisture (e.g., via a desiccant) from the air. As an example, air circulation over and/or through the pack 54 may remove enough moisture from the air within the storage space 34 to keep the relative humidity level below a level at which mold may grow. As another example, the relative humidity may be maintained by adding or removing moisture from the storage space 34 to maintain a target relative humidity for the specific plant product 14. Thus, at least the relative humidity in the storage space 34 may differ from the relative humidity of the air outside of the storage device 12. While the humidity regulation pack 54 is shown, it will be appreciated that other humidification regulation systems, such as a dehumidifier, may be utilized to keep the relative humidity of the sealed storage space 34 at a predetermined level. By way of example only, different strains of cannabis benefit from different humidity levels. For most strains, the target is 50% to 70% relative humidity, however, desiccant/humectant packs may be made to target other humidity levels for specific plant materials.

The storage device 12 may include one or more sensors to measure one or more conditions inside the storage device 12 or movement of the storage device 12. For example, sensors may measure motion, location (i.e., GPS), temperature and/or relative humidity of the storage space 34. As shown, a humidity sensor 56 communicates with the storage space 34 to measure the partial pressure of water vapor inside the storage device 12. The sensors may be coupled to the PCB. The relative humidity, as measured by the sensor 56, may then be displayed for the consumer, such as on a display screen 58. Further, by the sensor 56, the system 10 and/or the device 12 may record the measured relative humidity level and notify the consumer if the relative humidity level reaches a predetermined level or is trending in a direction that suggests a problem with the pack 54, fan 46, or the plant product 14 in the containers 26. Notification of the relative humidity may be by way of the screen 58 or by other methods via the internet (see, e.g., FIGS. 13A-13G), described below. By way of further example, the system 10 and/or the device 12 may warn the consumer that the pack 54 should be replaced because the relative humidity level is too high or too low. The consumer may replace the pack 54 via an access panel 66.

In one embodiment, and with continued reference to FIGS. 4 and 5, a scale 60 may be secured to or reside on the partition wall 36. As shown, each container 26 sits on a respective scale 60 so that a mass of the plant product 14 may be periodically determined. Each scale 60 includes a free-standing platform on which the container 26 rests. Although not shown, the platform may hold a magnet. The scale 60 may read mass by way of a Force Transducer but is not limited to that sensor type as other sensor types are possible. The scale 60 may be coupled to a tare button 62 via the PCB and to the screen 58. The consumer may manually trigger measurement of the plant product 14. The mass of the container 26 on the scale 60 may be taken into account during any measurement so that the mass of the plant product 14 in the container 26 can be determined at any time or automatically according to a predetermined period, for example, each time the lid 22 is opened and then closed.

In the exemplary embodiment shown, a magnet 64 may be secured to each scale 60. The magnet 64 may magnetically secure the container 26 in position on the scale 60. In the situation in which the housing 16 is transported, for example, each container 26 may remain in position on the respective scale 60. The magnet 64 may thus eliminate or substantially reduce the possibility of the container 26 accidently disengaging from the scale 60, such as during handling and transportation of the storage device 12. The scale 60, the PCB, the lock mechanism 28, and the sensors may be powered by a battery (e.g., a lithium battery) or direct electrical connection.

Figure 8:
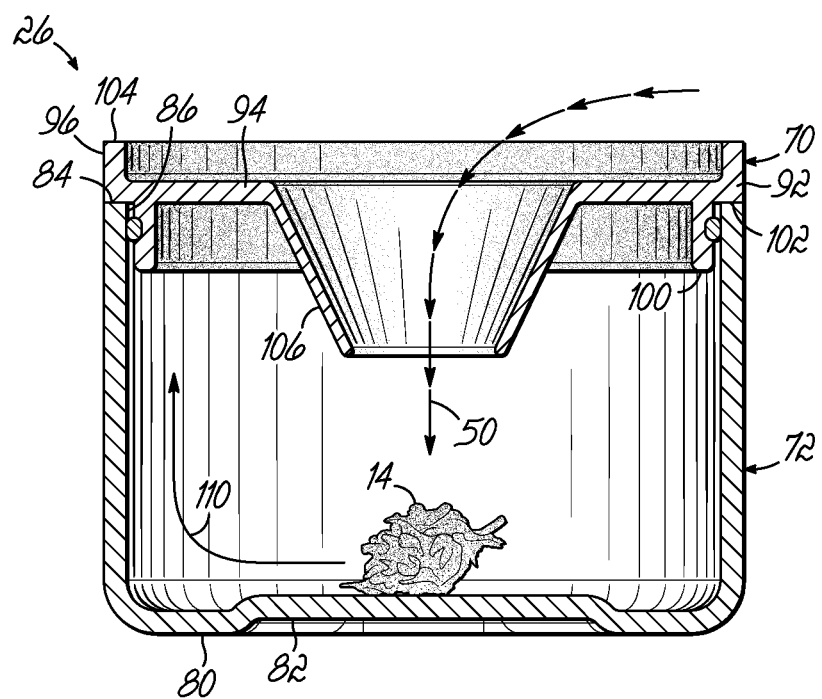
FIG. 8 is a cross-sectional view of the container shown in FIG. 7 taken along section line 8-8.

The plant product 14 is stored in one or more containers 26, as is shown in FIGS. 2, 4, and 8. The containers 26 are insertable into the housing 16, described above with reference to FIGS. 2 and 4. Each container 26 includes a lid 70 that is removably attached to a body 72. An O-ring 74 (FIG. 4) may be captured between the lid 70 and the body 72 and provide a tight fit between them. This prevents accidental separation of the lid 70 from the body 72.

Figure 6:
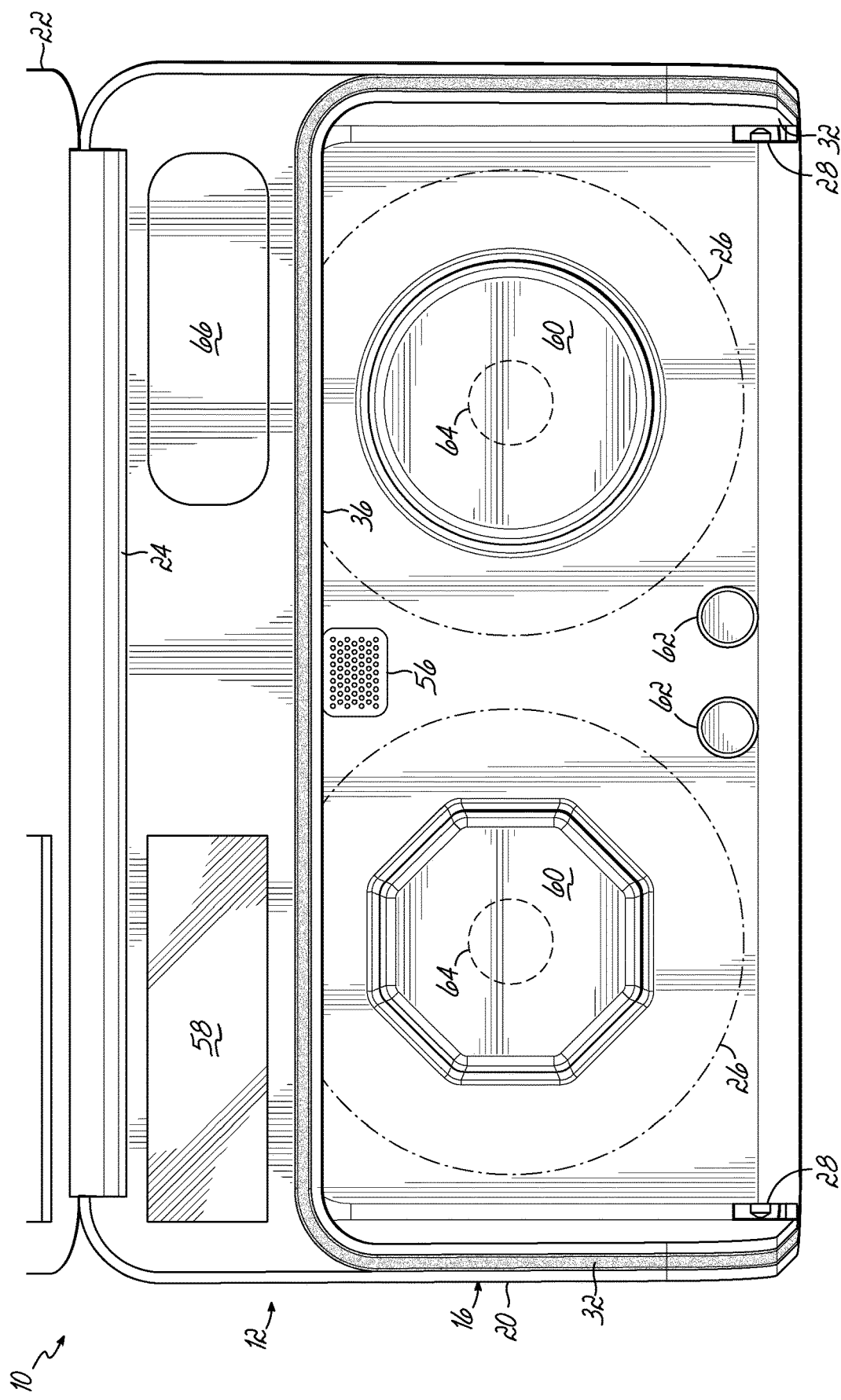
FIG. 6 is a plan view of a storage device with the lid shown opened.
Figure 9A:
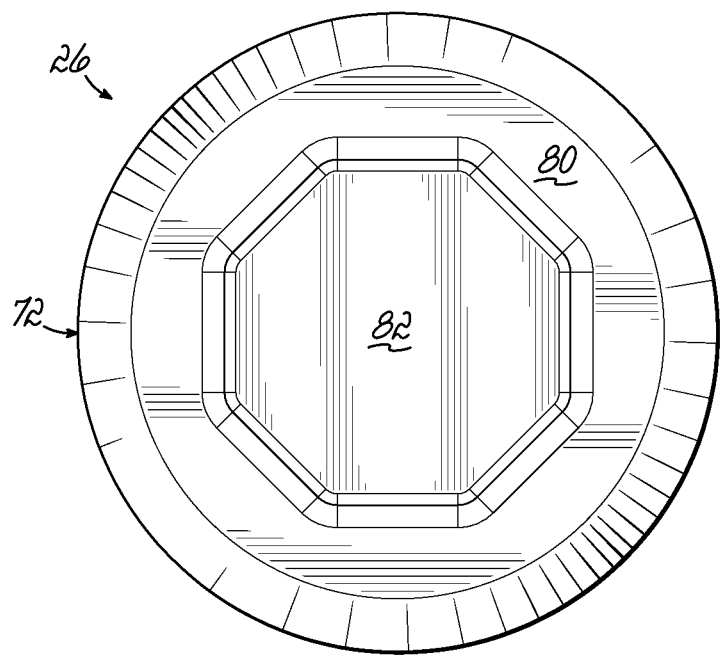
FIG. 9A is a bottom plan view of a container shown in FIG. 7 according to one embodiment.
Figure 9B:
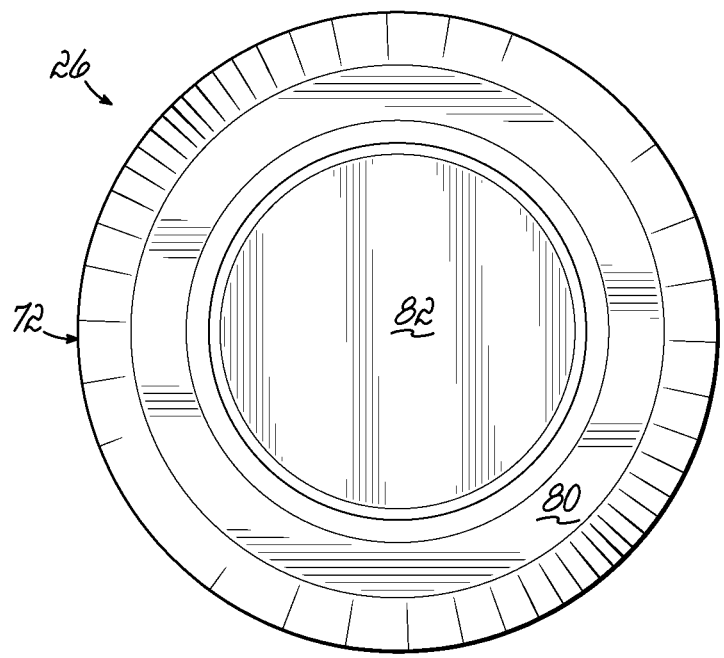
FIG. 9B is a bottom plan view of a container shown in FIG. 7 according to one embodiment.

With reference to FIG. 8, the body 72 includes a base 80 that closes off one end. The perishable product 14 resides on the base 80 during normal use of the container 26. The base 80 may include a push-up 82 generally centered in the base 80 and that forms a depression in the base 80. As is shown in FIGS. 9A and 9B, the push-up 82 may be configured as a specific shape. In one embodiment, that shape may correspond to a shape of one of the scales 60 (see e.g., FIG. 6) or a scale 360 (see e.g., FIG. 15), described below. In a further embodiment, the shape of the push-up 82 may be the same as a shape of the base 80 and/or the body 72 of the container 26 (see e.g., FIG. 15). A magnet (not shown) may form a portion of the base 80. The magnet may removably couple the container 26 to the scale 60, 360 either to a magnet in the scale 60, 360 or to a metallic free-standing platform. The push-up 82 may receive the scale 60, 360 as is shown in FIG. 4 so as to form a male-female fit between the container 26 and the housing 16 or a housing 316, described below.

In one embodiment, the shape of the push-up 82 is unique to each individual container 26. In the example shown, the container 26 on the right will not fit on the scale 60 on the left, and the container 26 on the left will not fit on the scale 60 on the right. Thus, while two containers 26 are shown, they differ from one another in at least the configuration of the push-up 82. No two containers 26 in the same device 12 may therefore be the same. Advantageously, because the containers 26 are different in at least the configuration of the push-up 82, different plant products 14 may be stored in each container 26. Each container 26 is then associated with a particular scale 60, 360 in the storage device 12. The system 10 is thus capable of tracking use and relative freshness of the plant products 14 stored in a respective container 26. The fit of the containers 26 relative to the scale 60, 360 prevents the consumer from misplacing the container 26 within the storage device 12. In the event that the consumer removes all of the containers 26 from the storage device 12, the consumer may not mix up the containers 26 on placing them back into the housing 16, 316. The continuity of the data associated with each of the container 26 is thereby maintained, if desired. In a further embodiment, the shapes of the containers 26 may match the shape of the push-up 82. In the exemplary embodiment shown in FIG. 8, the body 72 has a lip 84 at the end opposite the base 80. The lip 84 defines an opening 86 that removably receives the lid 70.

Figure 7:
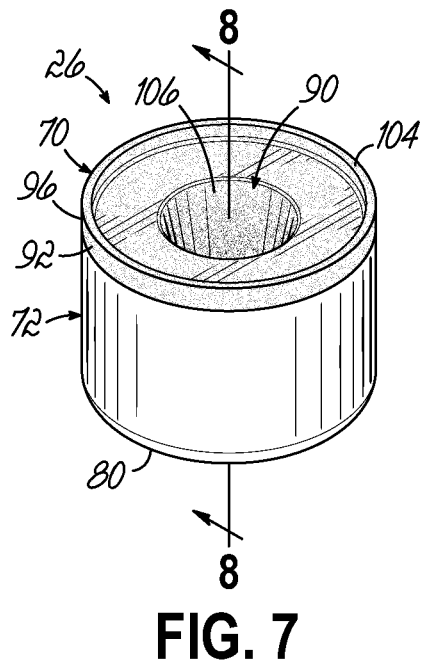
FIG. 7 is a perspective view of a container according to one embodiment of the invention.

With continued reference to FIGS. 7 and 8, the lid 70 does not fully close off the opening 86 in the body 72. In that regard, the lid 70 includes an opening 90 that permits air circulation according to arrow 50 from air circulation from the fan 46 (see FIGS. 4 and 5) and a fan 346 (see FIG. 18), discussed further below, while the container 26 resides in the housing 16. In the embodiment shown, the lid 70 includes a side wall 92 that extends away from an end wall 94. The side wall 92 includes an outwardly extending portion 96 and an inwardly extending portion 100 that are offset from one other so as to form a shoulder 102. The end wall 94 is therefore recessed below a rim 104 defined by the outwardly extending portion 96. The end wall 94 defines the opening 90 in the configuration of a funnel 106 that extends in the same direction as the inwardly extending portion 100.

As shown, when the lid 70 is inserted into the opening 86 of the body 72, the end wall 94 closes off a portion of the opening 86 of the body 72. The portion 100 of the side wall 92 cooperates with the body 72 so that the lip 84 abuts the shoulder 102 and the O-ring 74 is compressed between the body 72 and the portion 100 of the side wall 92. The lid 70 prevents accidental spills of the plant product 14 from the container 26.

When plant product 14 is inserted into the container 26, the plant product 14 drops through the funnel 106 and resides on the base 80 during normal orientation of the container 26, such as on the scale 60, 360. The funnel 106 permits air circulation into the container 26 (shown by arrow 50 in FIG. 8 and a plurality of arrows 350 in FIGS. 17-20, discussed further below) when the container 26 is in the housing 16. The funnel 106 reduces the likelihood that the plant product 14 in the container 26 accidently escapes from the container 26 in the event that the container 26 tips over or falls on its side. This is shown generally by the arrow 110 in FIGS. 8 and 17, which depicts movement of the plant product 14 if the container 26 is placed on its side and then on the rim 104. That is, if the container 26 flips over during handling, the lid 70 prevents or reduces spillage of the plant product 14 from the container 26. The funnel 106 permits air circulation but forms an essentially one-way opening in the lid 70. To remove the plant product 14 for use, the consumer removes the lid 70 from the body 72.

Figure 10:
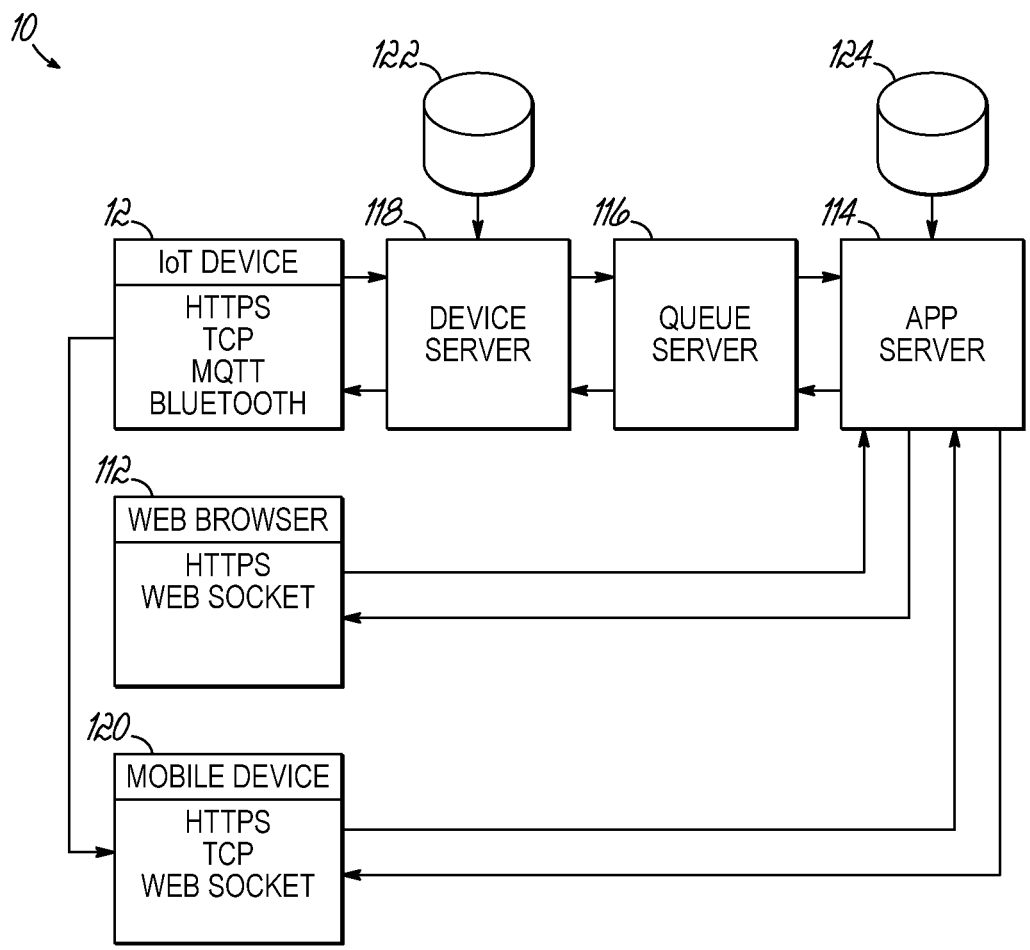
FIG. 10 is a schematic of a storage and monitoring system according to one embodiment.

With reference now to FIG. 10, in one embodiment, the storage device 12 may be a portion of the system 10 by which the consumer may monitor purchase, use, and freshness of the plant product 14 stored in the device 12 either via a web browser 112 and/or via a mobile device 120. The web browser 112 may be accessed on a computer (not shown), such as a personal computer, a server computer, a mini computer, a mainframe computer, a blade computer, a tablet computer, or a touchscreen computing device. The mobile device 120 may include a telephonic device, a cell phone, a mobile computational device, or other mobile device having a processor.

As shown, consumer interaction with the storage device 12 may be through one or more servers 114, 116, 118. Data gathered from the storage device 12 on the plant product 14 and information supplied by the consumer regarding the type of plant product 14 and any medical treatment information may be stored in one or more databases 122, 124. Data may include information on the type of plant product 14, when the product 14 was purchased, the rate at which the product 14 is being used, the relative humidity measured in the storage device 12, the internal temperature of the storage device 12, and whether the use of the product 14 meets any treatment guidelines, among other information. By way of further example, data showing consumption habits of plant material, such as quantity, type and strain as well as infographics showing usage of plant material over time. The app may also allow to collect and display feedback from the user, for example, consumption habits, user satisfaction, effect and flavor of plant material.

In that regard, the consumer may query the status of the plant product 14 in the storage device via the web browser 112 and/or the mobile device 120. Further, if the plant product 14 is for medical treatment, the treating physician may access any of the data described above and may also query information from the storage device 12 to determine medical treatment compliance. While with the system 10, the consumer is capable of locking and unlocking the storage device 12 locally at the storage device 12 or remotely by either the web browser 112 or the mobile device 120 to prevent unauthorized access, the treating physician (e.g., an authorized user other than the consumer) may also have authority to lock and unlock the storage device 12 via a web browser 112 or mobile device 120. In one embodiment, the authorized user can unlock the device 12 over Wi-Fi by using the app to send a message to the server 114, 116, and/or 118 which in turn communicates with the storage device 12. In one embodiment, the authorized user must be in Bluetooth range of the storage device 12 to unlock the device and the message is sent directly from the app to the storage device 12.

Figure 11:
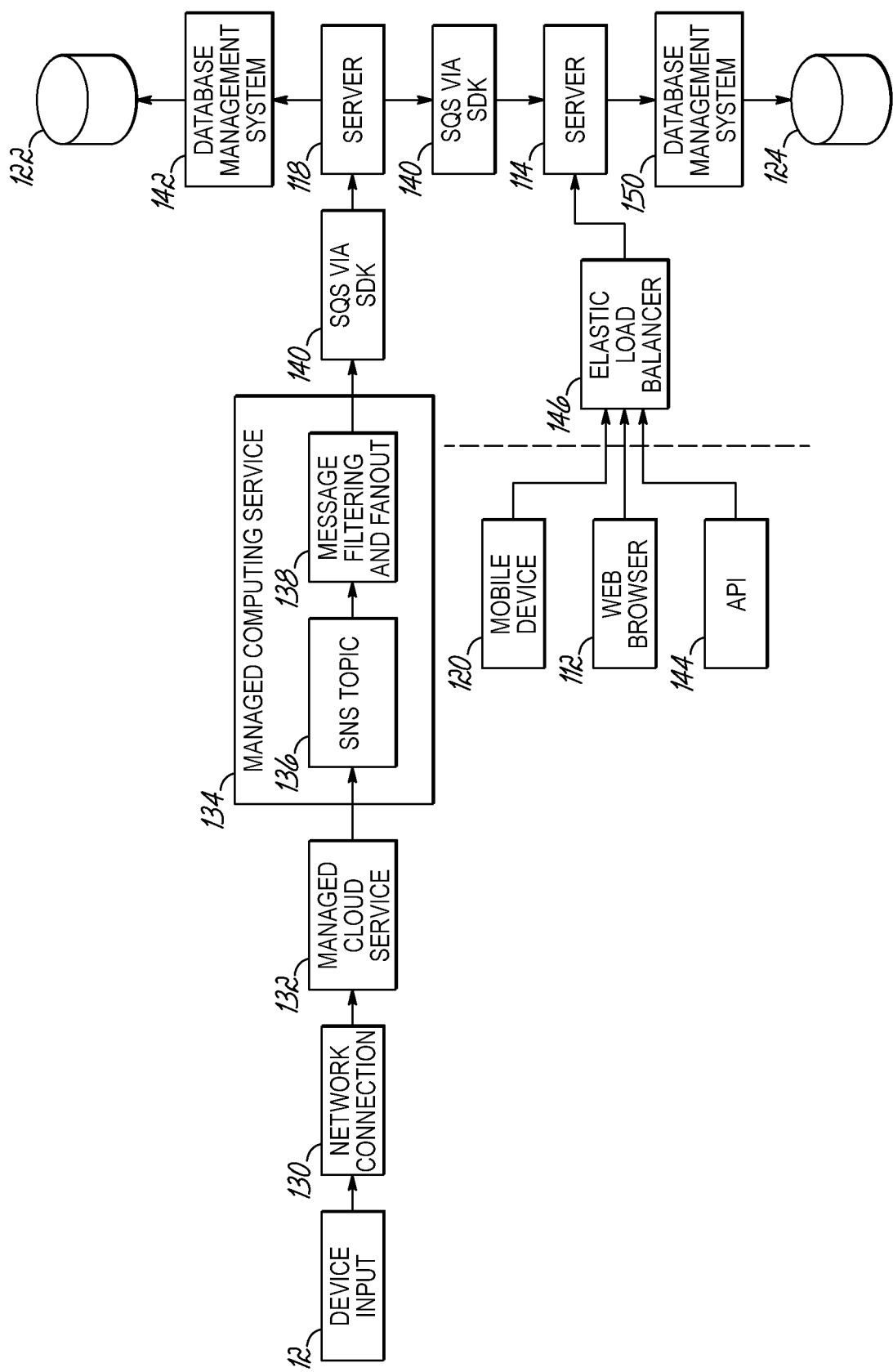
FIG. 11 is a flowchart illustrating communication of the storage and monitoring system according to embodiments of the invention.

In an exemplary embodiment of system 10 and with reference to FIG. 11, while not being limited to any particular network, the storage device 12 is operatively coupled via one or more wired or wireless connections 130 to a managed cloud service 132. As an example, the managed cloud service may be Amazon Web Service (AWS). The managed cloud service 132 may communicate with a managed computing service 134, such as Amazon SNS, in which the service 134 matches an SNS Topic 136 to consumers and delivers messages 138 to those consumers via an SQS 140 and the server 118. By way of example, the SQS 140 may be AWS Simple Queue Service. A database management system 142 manages data in the database 122. Traffic from each of the mobile device 120, web browser 112, and an application programming interface (API) 144 is managed by an elastic load balancer 146 through the server 114. A database management system 150 manages database 124.

Figure 12:
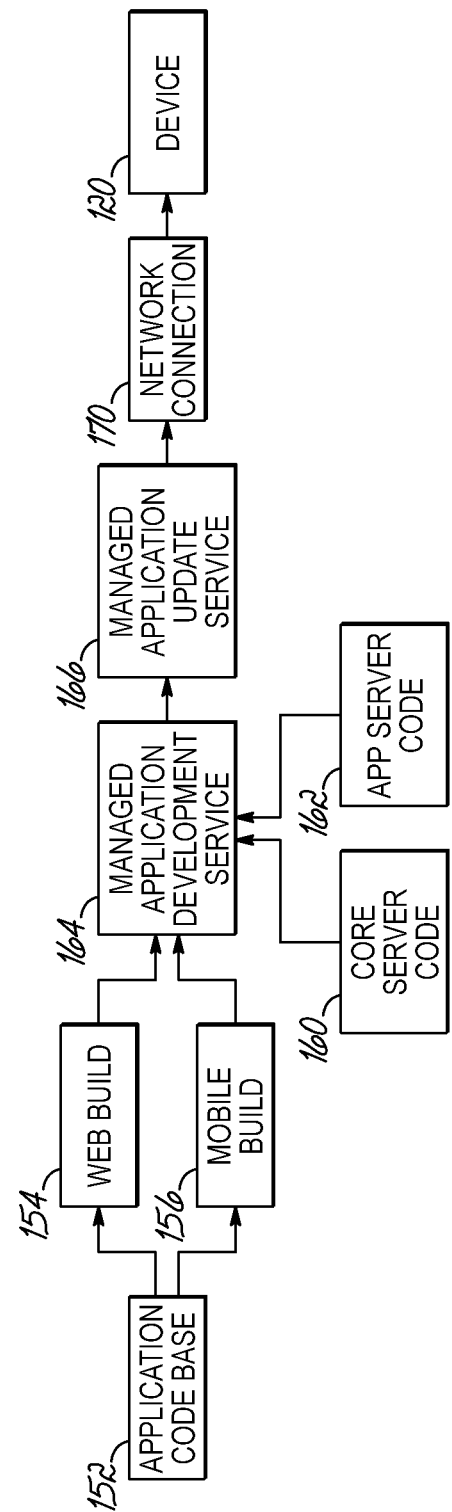
FIG. 12 is a flowchart illustrating development of a mobile device app according to one embodiment of the invention.

With reference to FIG. 12, application development according to, for example, the API 144, for accessing features and information of the storage device 12 is shown. In the exemplary development, an application code base 152 may be utilized to develop a web build 154 and a mobile build 156. A core server code 160, an app server code 162, and builds 154, 156 may be utilized with a development service 164 and update service 166 to develop application software that may be uploaded to the mobile device 120 via a network connection 170.

Figure 13A:
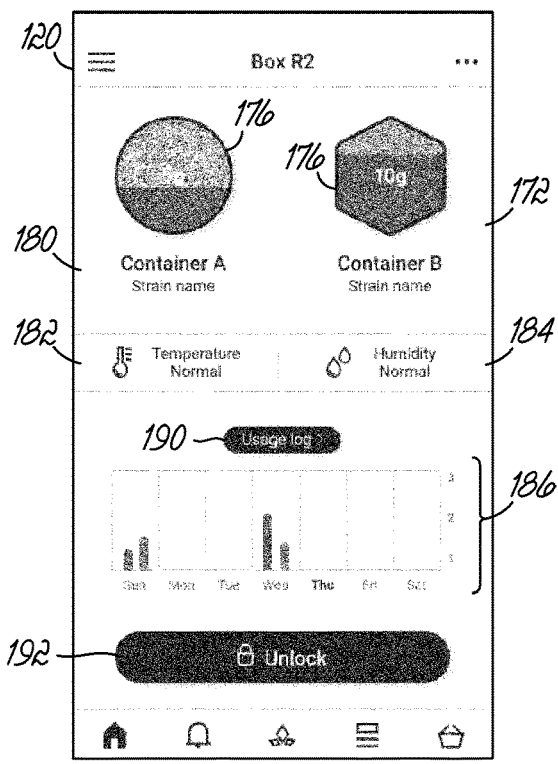
FIGS. 13A, 13B, 13C, 13D, 13E, 13F, and 13G are exemplary screen shots of an app for communicating with a storage and monitoring system of FIG. 10 according to one embodiment of the invention.
Figure 13B:
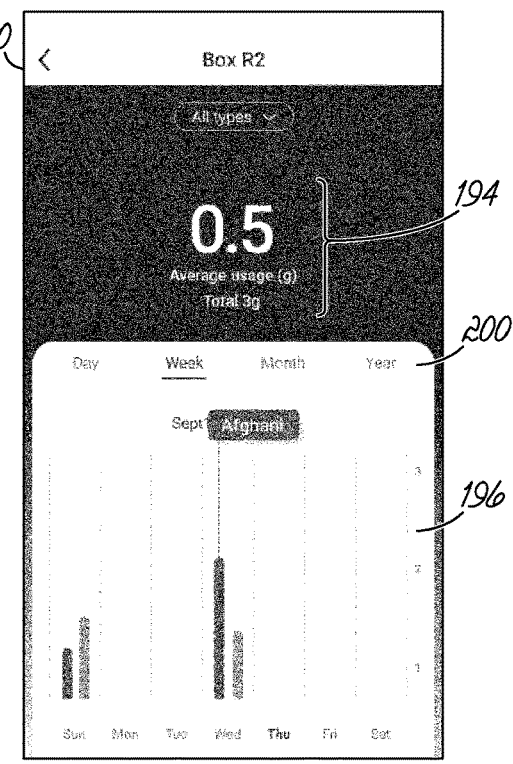
Figure 13C:
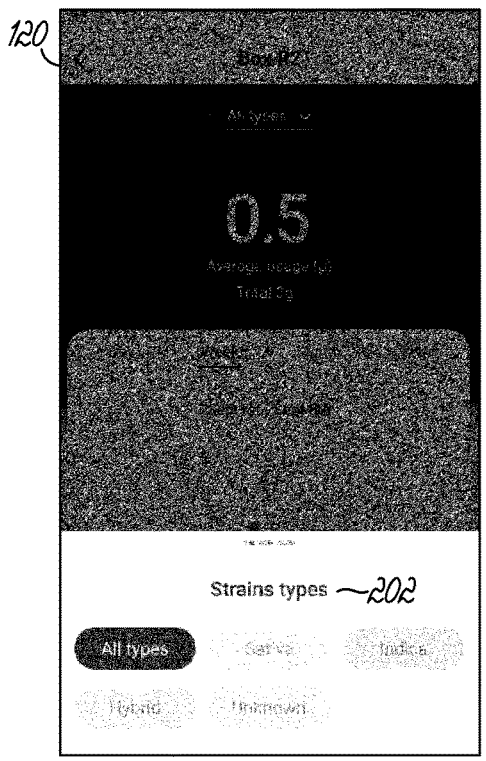
Figure 13D:
Figure 13E:
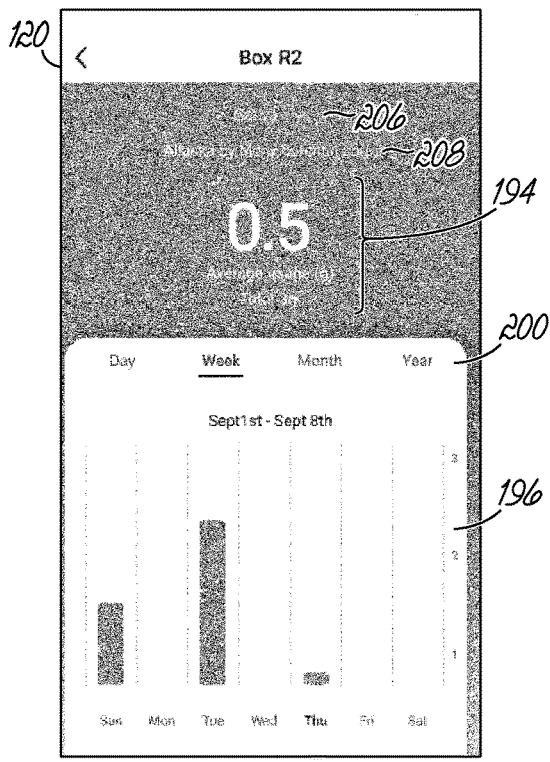
Figure 13F:
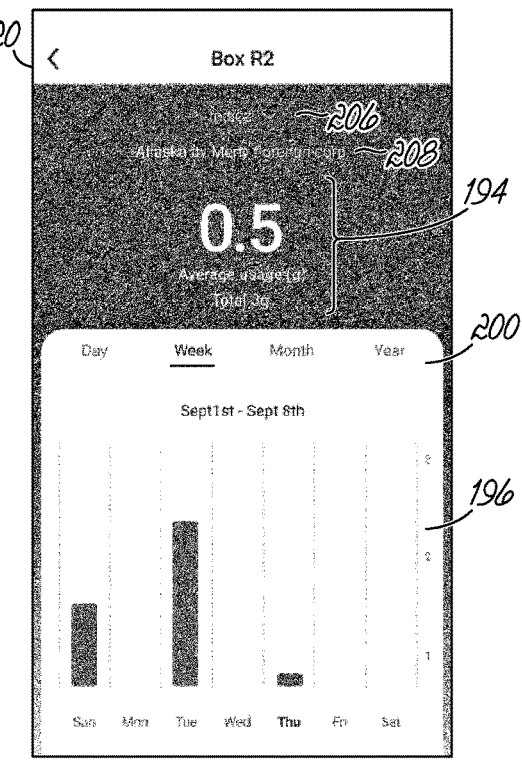
Figure 13G:
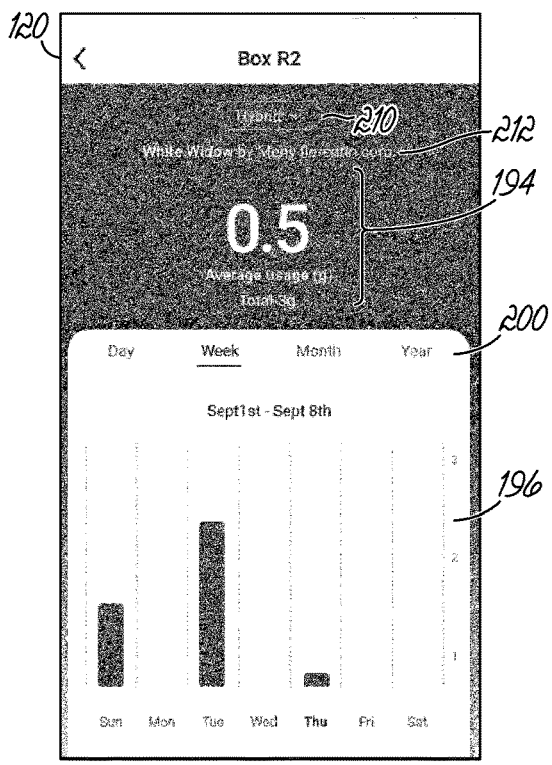

FIGS. 13A-13G depict exemplary screen shots for the mobile device 120 running an app developed according to one embodiment of the invention. As is shown in FIG. 13A, the consumer may view a status 172 of their storage device 12. An exemplary status view 172 shows a mass 176 of the plant product 14 present in each of containers 26 as measured by a respective scale 60, 360. Each mass 176 is depicted in the configuration of the corresponding push-up 82. A strain name 180 is also shown that may indicate a source or manufacture and/or a brand of plant product. The status view 172 provides information as to a temperature 182 as measured by a temperature sensor in the storage device 12 and a relative humidity 184 as measured by the sensor 56 or a sensor 356, discussed below. Usage information 186 may be graphically displayed with an icon 190 to view data and enter additional usage information. The lock mechanism 28 or a lock mechanism 328, discussed further below, may be toggled between locked and unlocked via an unlock icon 192. These icons are not limiting and are merely exemplary of the function of the app and its cooperation with the storage device 12 directly or via the system 10 (FIG. 10). FIG. 13B illustrates detail for the usage information 186 and may include statistical information 194 and a graphical calendar view 196 for a selectable time period 200. FIGS. 13C and 13D provide selectable logging information for strain types 202 and known brand names 204 for those strain types 202. FIGS. 13E and 13F depict additional information on usage for a selected strain type 206 of a brand name 208, and FIG. 13G depicts additional information for a selected strain type 210 of a brand name 212. While not shown, the information made available to the mobile device 120 may also be made available via the web 112.

Figure 14:
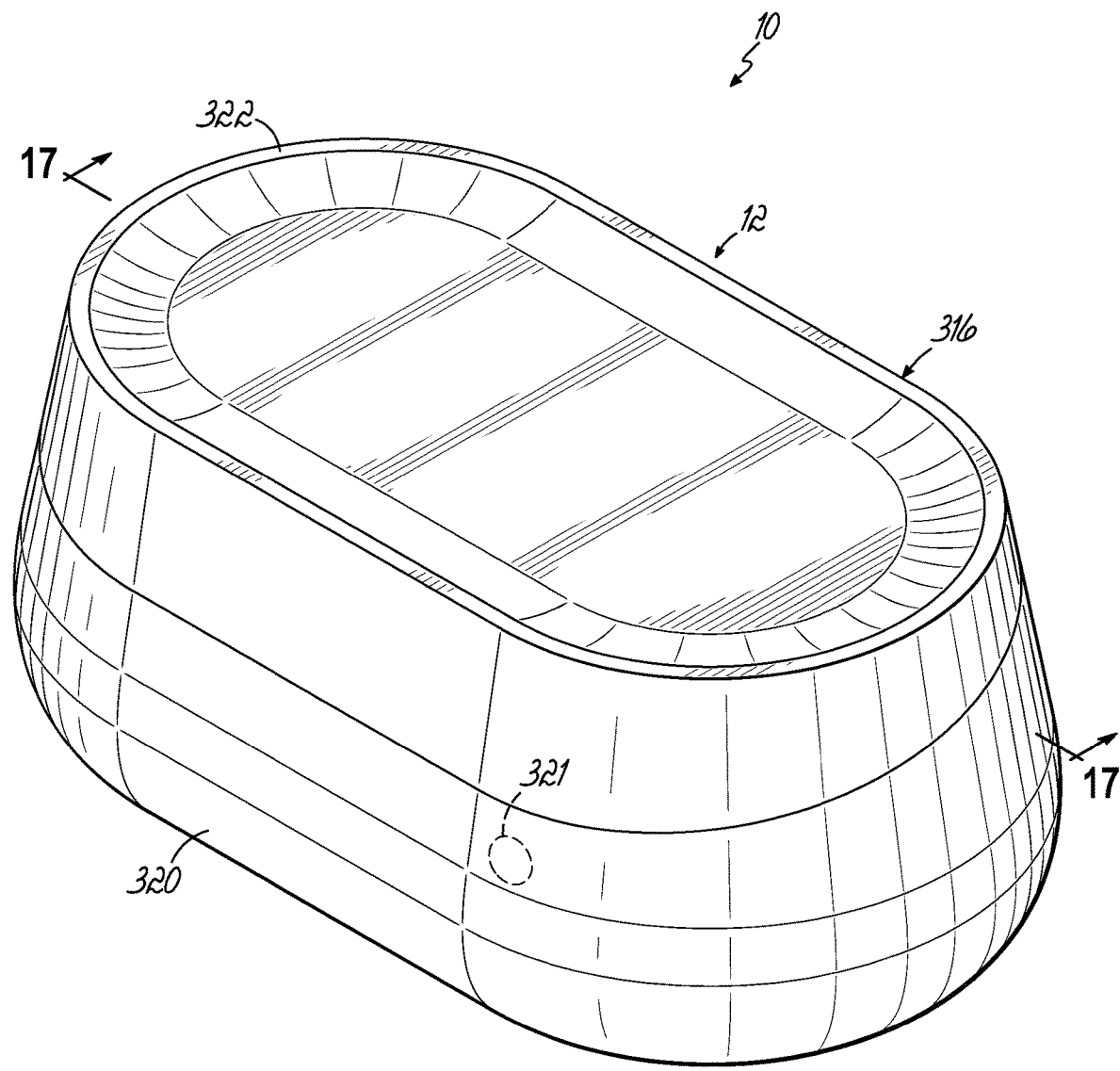
FIG. 14 is a perspective view of a storage device according to one embodiment of the invention.
Figure 15:
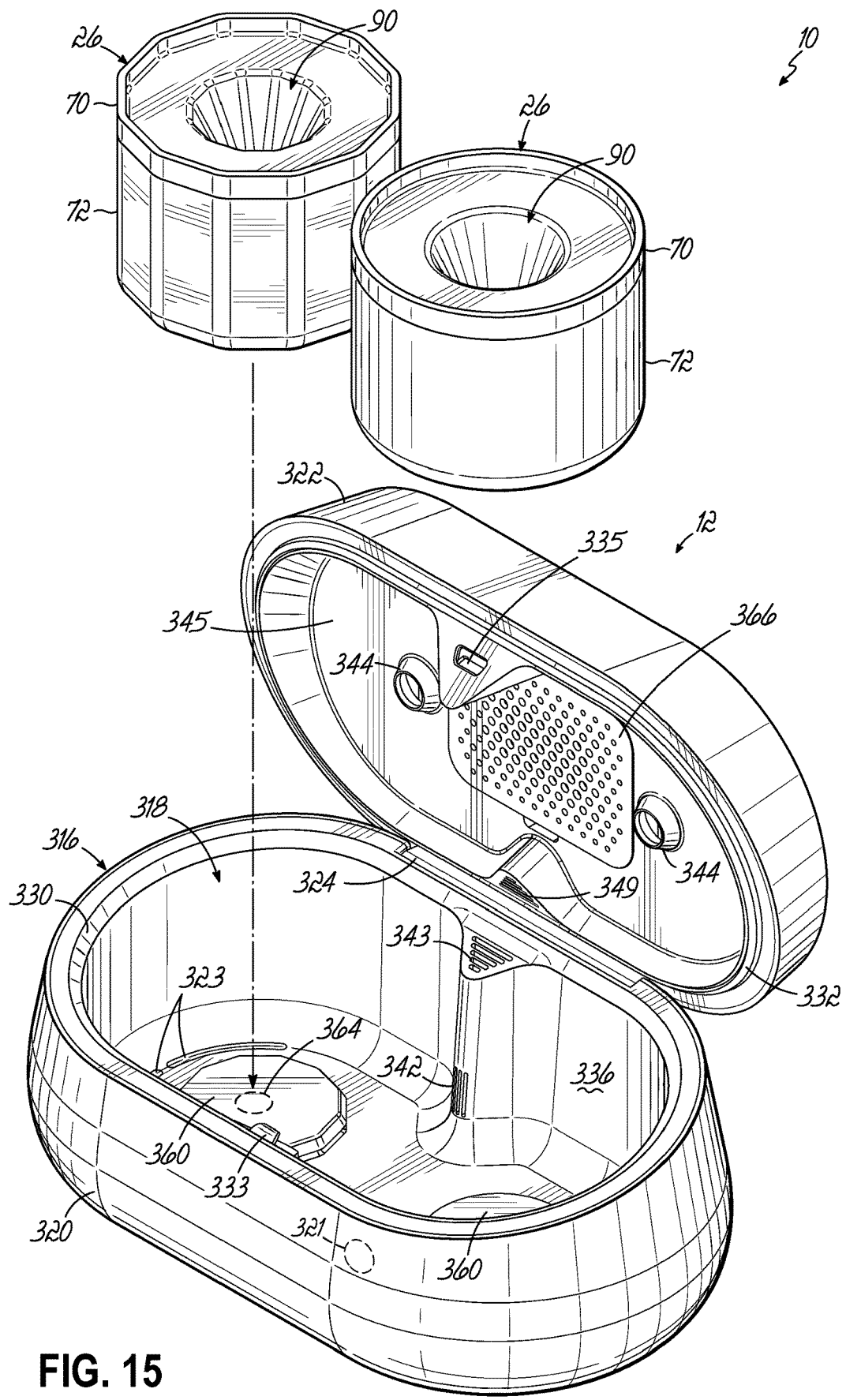
FIG. 15 is a perspective view of the storage device of FIG. 14 shown opened.
Figure 16:
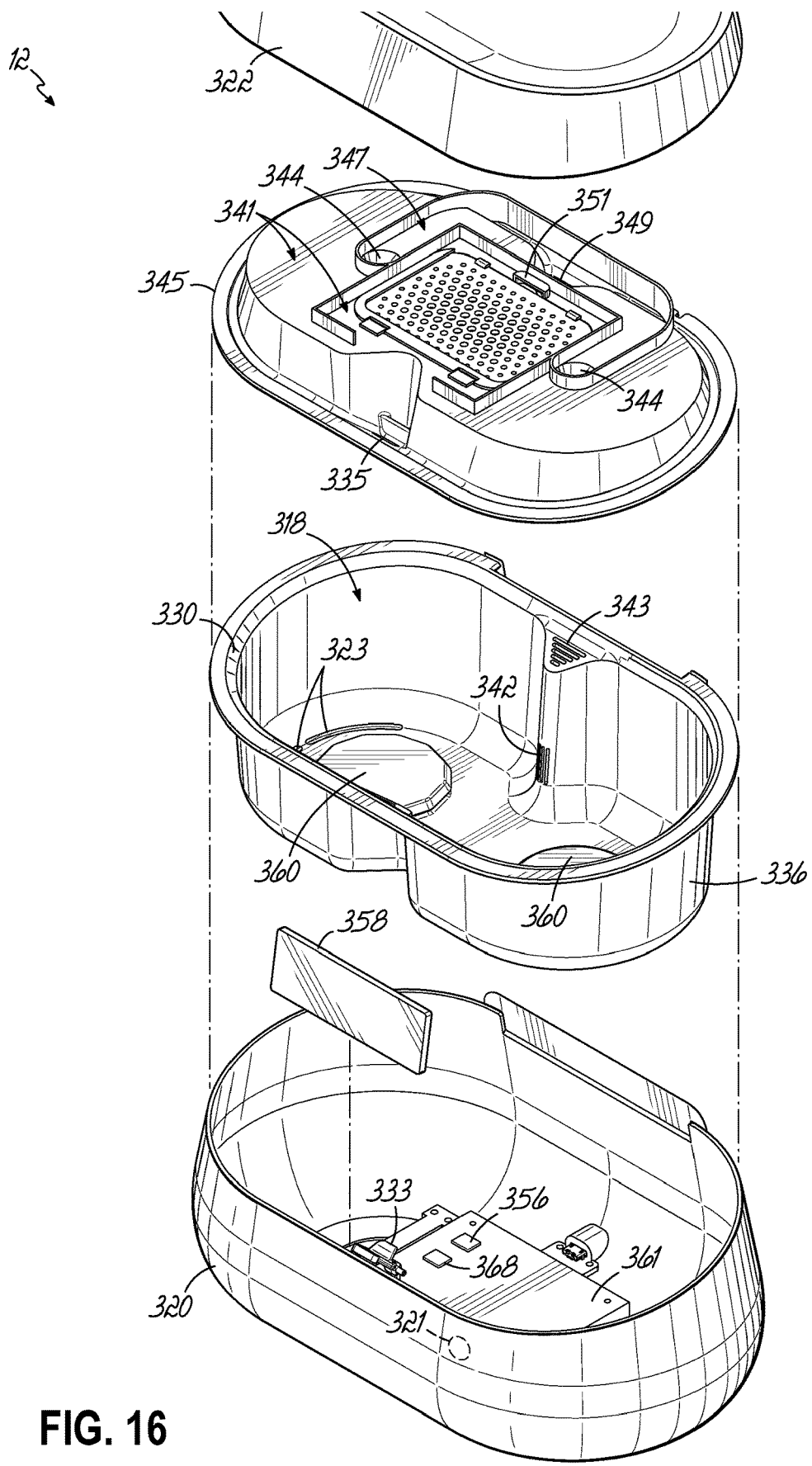
FIG. 16 is a disassembled perspective view of the storage device of FIG. 14.
Figure 17:
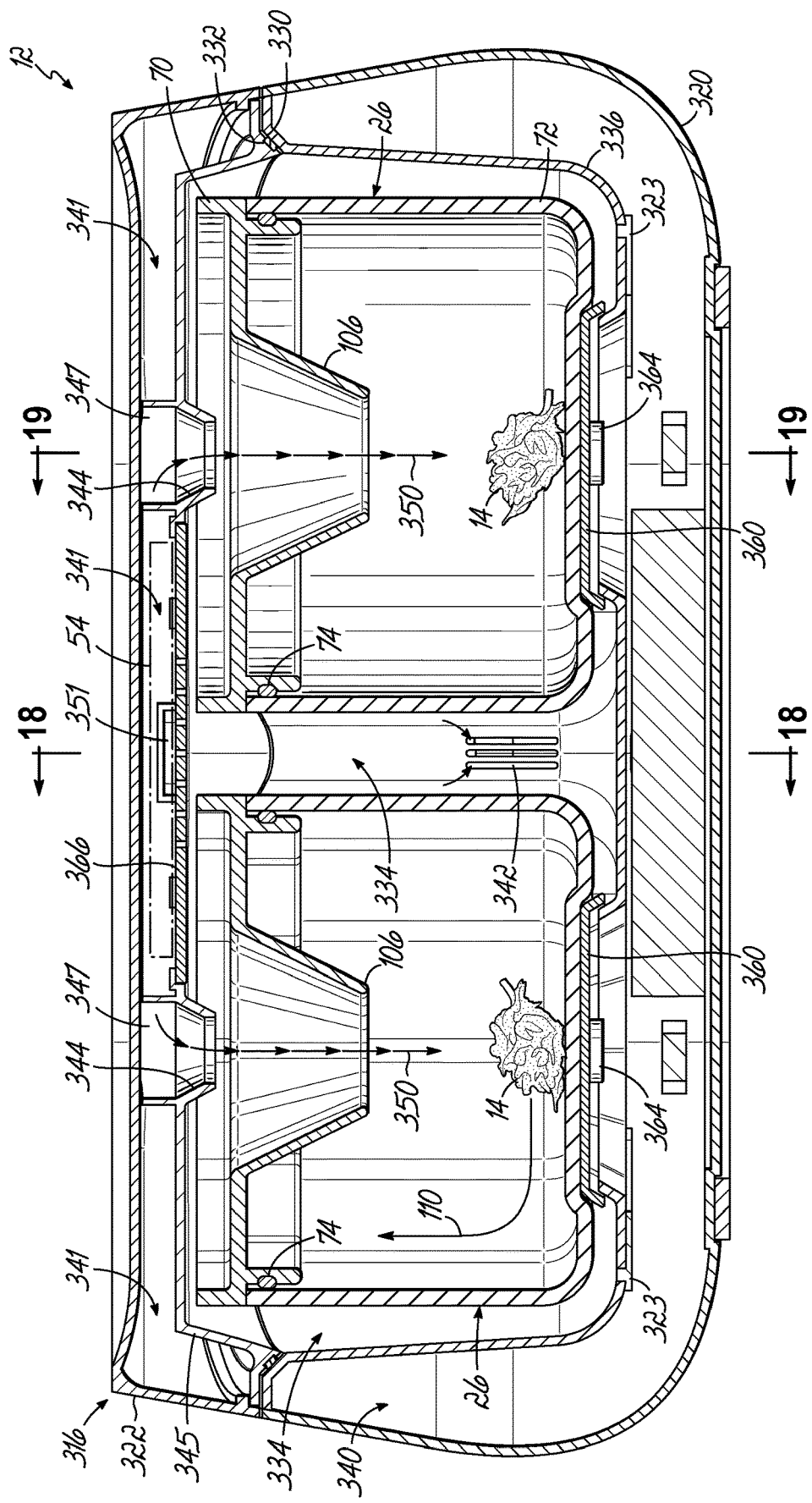
FIG. 17 is a schematic cross-sectional view illustrating exemplary air flow of the storage device shown in FIG. 14 taken along section line 17-17.

FIGS. 14-20 depict an alternative embodiment of the storage device 12 for storage of a perishable product 14, such as a plant product (shown in FIG. 17). Each of the features disclosed with respect to FIGS. 14-20 may be utilized in a similar manner with the system 10 and/or the device 12 shown in FIGS. 1-13G. With reference to FIGS. 14 and 15 in particular, the storage device 12 has a housing 316 including a sidewall 320 that defines an opening 318 and a lid 322 that is selectively lockable in the opening 318 in a closed position. The housing 316 may be made of a material that blocks sunlight and may only block UV light so that any plant product 14 stored in the storage device 12 is not exposed to UV light when the lid 322 is closed. When the lid 322 is opened, one or more lights 323 (e.g., LEDs) inside the housing 316 may turn on to enhance the visibility of the containers 26 and interior of the housing 316. In one embodiment, neither the lid 322 nor the sidewall 320 includes any penetrations or other features that permit light to enter the housing 316 when the lid 322 is closed. In one embodiment, there is a capacitive button 321 (shown, for example, in FIG. 16) that is coupled to a PCB board 361. In one embodiment, the capacitive button 321 may be used to pair the storage device 12 with a mobile device 120. The capacitive button 321 may have other functions. For example, in one embodiment, the capacitive button 321 may be used to turn the storage device 12 on and/or off. These examples are merely illustrative. Furthermore, the capacitive button 361 may be located in other places and embodiments of the invention are not limited to the functions disclosed. In the exemplary embodiment, when unlocked, the lid 322 is movable about a hinge 324 to an opened position in which the consumer can then access their product 14 stored in the device 12 through the opening 318. The product 14 is storable in one or more individual containers 26 removably contained within the housing 316. Although containers 26 are shown removable from the housing 316, the containers may be secured within the housing 316 and so may not be removable. The purpose and function of the containers 26 is described above with reference to FIGS. 7-9B.

Figure 18:
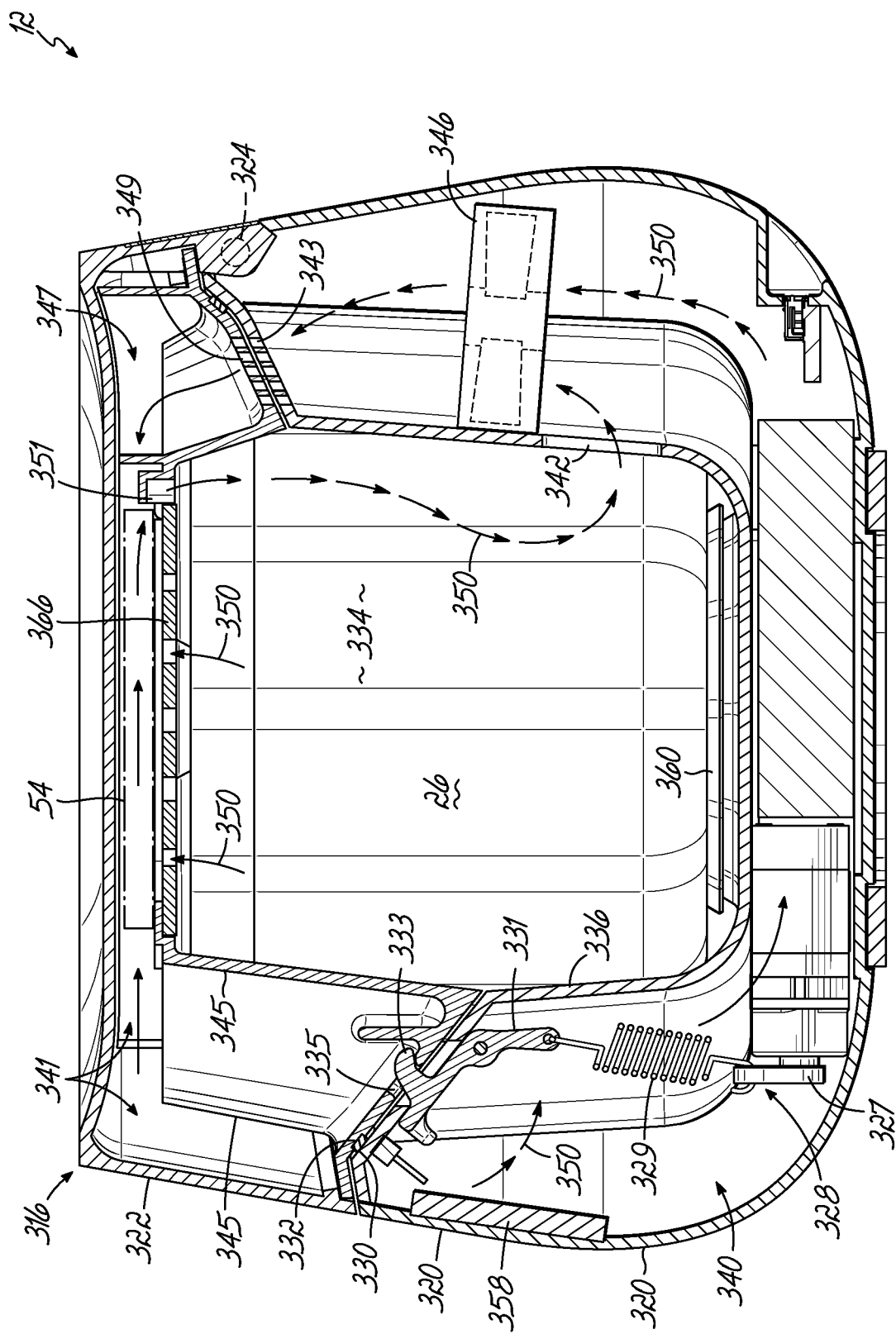
FIG. 18 is a schematic cross-sectional view further illustrating exemplary air flow of the storage device of FIG. 14 taken along section line 18-18 in FIG. 17.

With reference to FIG. 18, the storage device 12 is lockable via a lock mechanism 328 that is operable to prevent the lid 322 from being opened when the lid 322 is in the closed position. The lock mechanism 328 may be in electrical communication with a printed circuit board (PCB) 361 (see FIG. 16), discussed below, through which the consumer can operate the lock mechanism 328 either while in close proximity to the storage device 12 through a user interface (not shown) on the housing 316 or when the consumer is located remotely from the device 12 through a cell phone or similar mobile device, described above with reference to FIGS. 1-13G. In one embodiment, the PCB 361 is located between the two scales 360.

In the exemplary embodiment, the lock mechanism 328 comprises a server arm 327 which is coupled to a biasing member 329 which is in turn coupled to a lever arm 331. In this embodiment, the lever arm 331 comprises a projection 333 that is configured to fit inside a receptacle 335 (see FIG. 15) located on the lid 322 which selectively receives the projection 333 when the lid 322 is in the closed position and the consumer toggles the lock mechanism 328 to an engaged position. Embodiments of the invention are not limited to the type and arrangement of the components of the lock mechanism 328 shown. For example, the locking mechanism 328 might be coupled to or contained within the lid 322 while the receptacle might be coupled to the sidewall 320. Once engaged, the lock mechanism 328 secures the lid 322 in the closed position. The lock mechanism 328 may only be disengaged by the consumer or authorized user.

With further reference to FIG. 15, the storage device 12 also includes systems to reduce the rate at which the product 14 decays and to reduce or eliminate the possibility of mold formation on the product 14. To that end, the housing 316 is sealable against infiltration of air from external to the housing 316 when the lid 322 is closed. In the exemplary embodiment, a seal member 330 traces the opening 318 of the sidewall 320 and engages a seal ring 332 (e.g. an O-ring) on the lid 322. Embodiments of the invention are not limited to the type and arrangement of the seal member and seal ring shown. For example, the lid 322 may include a seal member 330 that engages a seal ring 332 (e.g., an O-ring) that traces the opening 318 in the sidewall 320. When closed, the seal member 330 and the seal ring 332 form an impermeable seal. Once sealed, the housing 316 includes a sealed storage space 334, shown best in FIGS. 17-20. The ambient environment in the sealed storage space 334 is controllable and so may differ from the natural environment outside of the storage device 12. That is, air movement between the sealed storage space 334 and the air outside of the storage device 12 is prevented. The sealed storage space 334 encompasses the containers 26 and the plant product 14 and may include additional compartments within the housing 316. When present, the additional compartments may house components that provide additional functionality to the device 12 and system 10.

In one embodiment, and with reference to FIGS. 15-20 and to FIG. 16, in particular, a partition wall 336 may separate the storage space 334 from a compartment 340. The partition wall 336 includes at least one inlet port 342 and at least one outlet port 343. In one embodiment, a partition wall 345 is located in the lid 322. When the lid 322 is in the closed position, the walls 336 and 345 may collectively separate the storage space 334 into a first compartment 341 and a second compartment 347 for directing airflow in and around the containers 26 in the storage space 334. The partition wall 345 includes at least one inlet port 349 (shown best in FIG. 15). The at least one inlet port 349 aligns with the outlet port 343 when the lid 322 is closed and is configured to receive the airflow from the at least one outlet port 343. The partition wall 345 also includes at least one exhaust port 344 that directs airflow from second compartment 347 towards the containers 26 in the storage space 334. In one embodiment, the number of the exhaust ports 344 is equal to the number of containers 26. In the exemplary embodiment, there are two exhaust ports 344 though embodiments of the invention are not limited to two. Specifically, there may be one or more than two, for example, three or four. The location of individual exhaust ports 344 may depend on the location of a respective one of the containers 26. In one embodiment, the at least one exhaust port 344 is co-axial with the opening of the container opening 90 as is shown in FIG. 17.

In the embodiment shown, the inlet port 342 and outlet port 343 are gratings or other opening in the partition wall 336. Similarly, the inlet port 349 is a grating along portion of partition wall 345. The exhaust ports 344 are formed into a funnel configuration and protrude out from the partition wall 345 into the storage space 340. The storage space 334 is in fluid communication with the compartment 340 via port 342. The compartment 340 is in fluid communication with the compartment 347 via ports 343, 349. The compartment 347 is in fluid communication with the storage space 334 via port(s) 344. The storage space 334 is also in fluid communication through a porous access panel 366 and through a port 351 with a desiccant package 54 (shown best in FIG. 17). Dehumidified air may therefore circulate through the desiccant package 54 without the airflow being forced.

Figure 19:
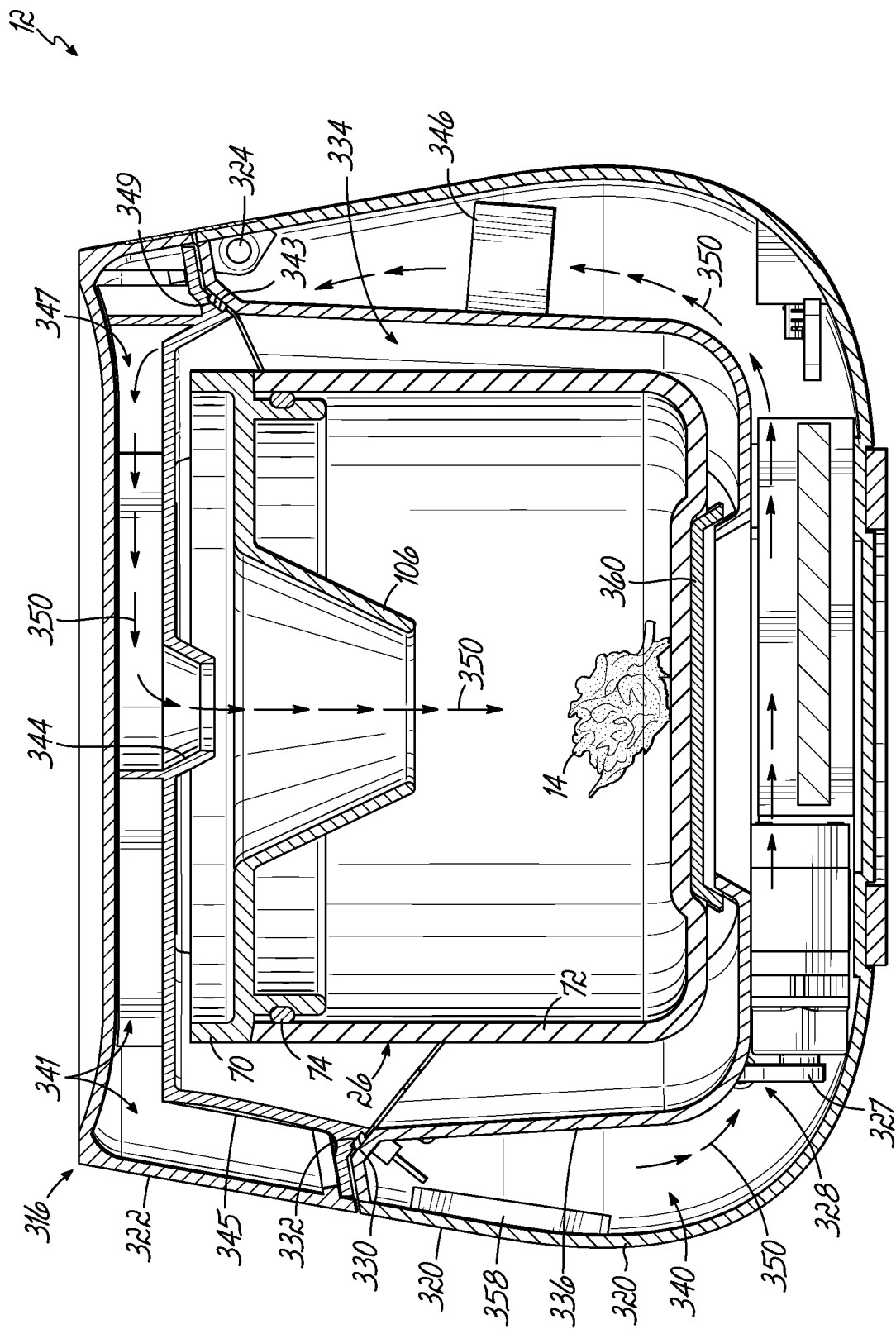
FIG. 19 is a schematic cross-sectional view illustrating exemplary air flow of both the storage device of FIG. 14 and a container within the storage device taken across section line 19-19 in FIG. 17.
Figure 20:
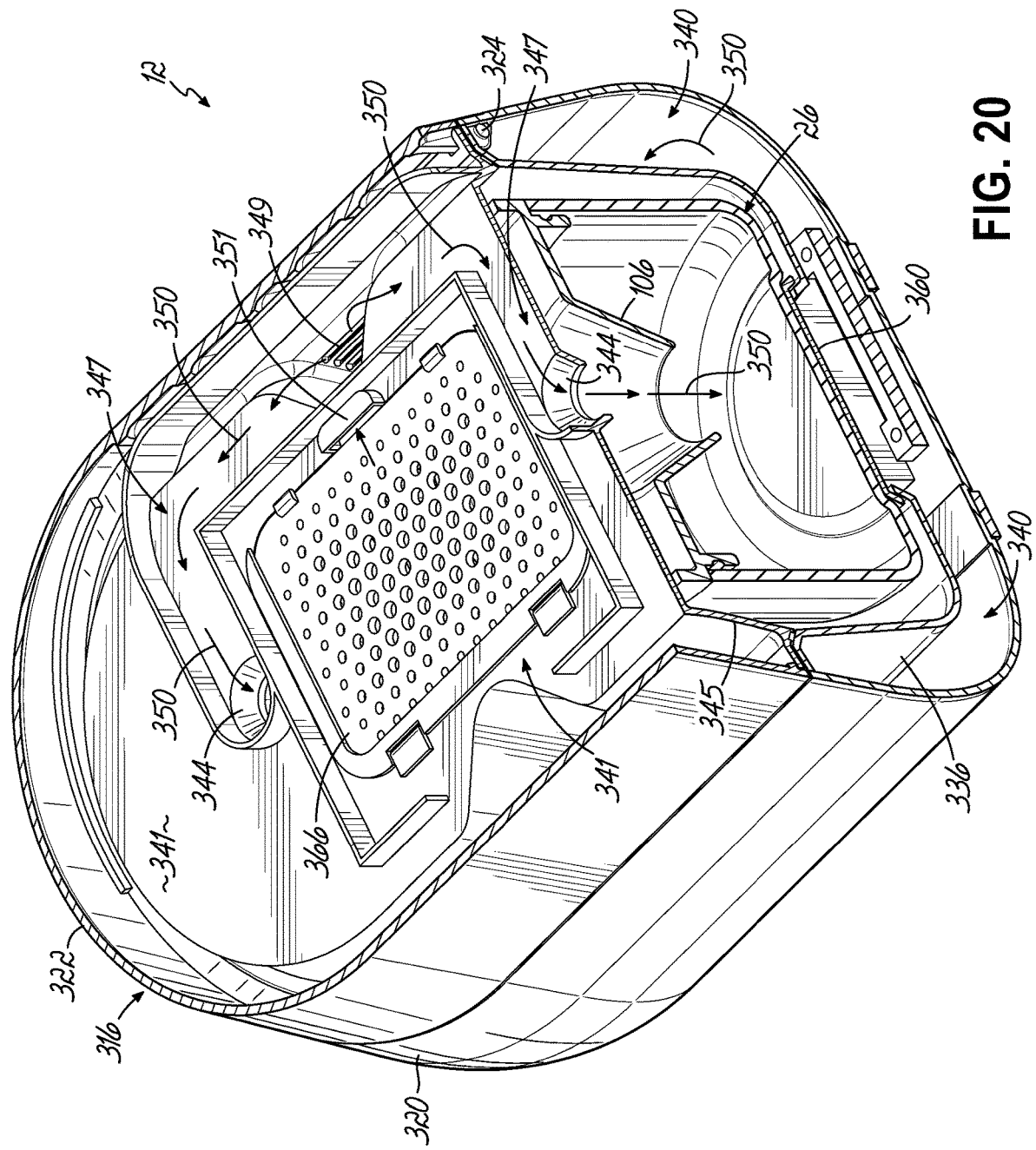
FIG. 20 is a perspective view with cross sections take on transverse and top-sectional planes to illustrate airflow throughout the storage device according to one embodiment.

In one embodiment and with reference to FIGS. 18 and 19, a fan 346 is housed in the compartment 340 and may be mounted proximate one of the ports 342, 343. In the exemplary embodiment, the fan 346 is secured to a portion of the partition wall 336 in the compartment 340 and is adjacent the ports 342, 343. When energized, the fan 346 circulates air through the container 316 as is shown by way of arrows 350 in FIGS. 17-20. As shown, the fan 346 directs air from around the containers 26 through the inlet port 342, through the compartment 340, out of the outlet port 343, through the inlet port 349 into compartment 347 and out of ports 344 in alignment with the opening in the containers 26. This causes the air from storage space 334 to be directed through the each of the compartments 340 and 347 when the fan 346 is operational via a negative partial pressure. As shown, the ports 344 are located to direct air toward the containers 26. This facilitates air circulation inside the container 26, as shown by the arrows 350 in FIGS. 17, 19, and 20. The fan 346 may be operated continuously when the lid 322 is closed to circulate the captured air in the storage space 334 and the compartments 340, 341, 347 into and around containers 26 in which the product 14 is stored. The fan 346 may also operate non-continuously and for determined periods of time according to an algorithm.

In one embodiment, the relative humidity level in the storage space 334 is controlled to eliminate the possibility of mold growth on the plant product 14. By way of example, a humidity regulation pack 54 may be housed in the compartment 341. Although not shown, the fan 346 may direct a portion of the airflow over and/or through the humidity regulation pack 54 in the compartment 341. However, it is contemplated that air movement in the storage space 334 will cause sufficient flow through the porous access panel 366 to maintain a targeted humidity level inside the storage space 334. The pack 54 includes a substance that helps control the relative humidity in the air by adding moisture (e.g., via a humectant) or removing moisture (e.g., via a desiccant) from the air. As an example, air circulation over and/or through the pack 54 may remove enough moisture from the air within the storage space 334 to keep the relative humidity level below a level at which mold may grow. As another example, the relative humidity may be maintained by adding or removing moisture from the storage space 334 to maintain a target relative humidity for the specific plant product 14. Thus, at least the relative humidity in the storage space 334 may differ from the relative humidity of the air outside of the storage device 12. While the humidity regulation pack 54 is shown, it will be appreciated that other humidification regulation systems, such as a dehumidifier, may be utilized to keep the relative humidity of the sealed storage space 334 at a predetermined level. By way of example only, different strains of cannabis benefit from different humidity levels. For most strains, the target is 50% to 70% relative humidity, however, desiccant/humectant packs may be made to target other humidity levels for specific plant materials.

The storage device 12 may include one or more sensors to measure one or more conditions inside the storage device 12 or movement of the storage device 12. For example, sensors may measure motion, location (i.e., GPS), temperature and/or relative humidity of the storage space 334. As shown, a humidity sensor 356 communicates with the storage space 334 to measure the partial pressure of water vapor inside the storage device 12. The sensors may be coupled to the PCB board 361. The relative humidity, as measured by the sensor 356, may then be displayed for the consumer, such as on a display screen 358 (see, e.g., FIGS. 16, 18, and 19) that may be viewable from a front of the storage device 12 through sidewall 320. This display screen may be visible through the sidewall 320 through a transparent or translucent window (not shown). Further, by the sensor 356, the system 10 and/or the device 12 may record the measured relative humidity level and notify the consumer if the relative humidity level reaches a predetermined level or is trending in a direction that suggests a problem with the pack 54, the fan 346, or the plant product 14 in the containers 26. Notification of the relative humidity may be by way of the screen 358 or by other methods via the internet (see, e.g., FIGS. 13A-13G), described above. By way of further example, the system 10 and/or the device 12 may warn the consumer that the pack 54 should be replaced because the relative humidity level is too high or too low. The consumer may replace the pack 54 via the porous access panel 366 (see FIG. 15). In one embodiment, the relative humidity sensor 356 may also function as a temperature sensor.

In one embodiment, and with reference to FIGS. 15 and 16, a scale 360 may be secured to or reside on the partition wall 336. As shown, each container 26 sits on a respective scale 360 so that a mass of the plant product 14 may be periodically determined. Each scale 360 includes a free-standing platform on which the container 26 rests. Although not shown, the platform may hold a magnet. The scale 360 may read mass by way of a Force Transducer but is not limited to that sensor type as other sensor types are possible. The scale 360 may be coupled to the screen 358 via PCB board 361. The consumer may manually trigger measurement of the plant product 14. The mass of the container 26 on the scale 360 may be taken into account during any measurement so that the mass of the plant product 14 in the container 26 can be determined at any time or automatically according to a predetermined period, for example, each time the lid 322 is opened and then closed.

In the exemplary embodiment shown, a magnet 364 may be secured to each scale 360. The magnet 364 may magnetically secure the container 26 in position on the scale 360. In the situation in which the housing 316 is transported, for example, each container 26 may remain magnetically coupled on the respective scale 360. The magnet 364 may thus eliminate or substantially reduce the possibility of the container 26 accidently disengaging from the scale 360, such as during handling and transportation of the storage device 12. The scale 360, the PCB board 361, the lock mechanism 328, and the sensors may be powered by a battery (e.g., a lithium battery) or direct electrical connection.

In one embodiment, the storage device 12 may include a gyroscopic sensor 368. The gyroscopic sensor 368 may be used by system 10 to determine relevant information such as the orientation of plant product 14 or the relative level of the scales 60, 360. In one embodiment, the relative level of the scales 60, 360 may be used to calculate a more accurate weight measurement of plant product 14. In one embodiment, the relative level of the scales 60, 360 may be used to alert the authorized user to place the storage device 12 on a level surface before taking a weight measurement. As the tilt of the device 12 is increased, the error in measurement increases. For example, the device 12 may notify the user if the gyroscope measures 3 or 4 degrees or higher out of level. In that case, the device 12 may indicate that error and notify the user that the device 12 is out of level and that the weight measurement may be erroneous. The user can then take appropriate action. In one embodiment, the relative level may be used to disregard weight measurements taken while the storage device 12 is not level. When the storage device 12 is not level, the device 12 may prohibit access to any plant material in the device 12. That is, the device 12 may automatically lock and remain locked until the device 12 is leveled. As yet another alternative, the gyroscope measurement may be taken into account during weight measurement to account for known measurement error obtained from a calibration of a known weight at different degrees of tilt. In one embodiment, the gyroscopic sensor might be included on the PCB board 361 and thereby coupled to the scales 60, 360. In one embodiment, the gyroscopic sensor may also comprise an accelerometer. By way of example, the gyroscope sensor 368 may be model MPU-6000 or MPU-6050 available from InvenSense, Sunnyvale, Calif.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A storage device for storing a plant product comprising:
a housing having a sidewall that defines an opening;
a lid coupled to the sidewall and movable to a closed position in which the opening is closed off, and the lid in cooperation with the sidewall define a storage space in the housing;

at least one scale in the storage space for measuring mass; and at least one container that receives the plant product and that is removably received in the storage space;

wherein the at least one container is configured to rest on the at least one scale such that the at least one scale and the at least one container form a male-female connection.

2. The storage device of claim 1 wherein when the at least one container is in the storage space, the at least one container is open to the storage space.

3. The storage device of claim 1 wherein the at least one container has a body and a lid that is removably received on the body, the lid having an opening through which the plant product is inserted into the at least one container.

4. The storage device of claim 3 wherein the opening of the at least one container is a funnel that projects into the at least one container.

5. The storage device of claim 1 further comprising a fan in the housing for circulating air in the storage space.

6. The storage device of claim 5 wherein a partition wall separates the storage space from a compartment in which the fan is located, the partition wall including at least one inlet port and at least one exhaust port, wherein the fan is configured to circulate air from the storage space through the at least one inlet port and out of the at least one exhaust port.

7. The storage device of claim 6 wherein the number of exhaust ports equals the number of containers.

8. The storage device of claim 1 wherein the device further comprises at least one sensor selected from a group consisting of:
a relative temperature sensor;
a gyroscopic sensor;
a location sensor;
a relative humidity sensor; and
a motion sensor.

9. The storage device of claim 1 further comprising a humidity regulation device or a humidity regulation device substance in the storage space.

10. The storage device of claim 1 further comprising a relative humidity sensor in the storage space for measuring relative humidity when the lid is in the closed position.

11. The storage device of claim 1 wherein the housing includes a lock mechanism selectively operable to lock the lid in the closed position.

12. The storage device of claim 1 further comprising:
a lock mechanism selectively operable to lock the lid in the closed position; and
a relative humidity sensor in the storage space for measuring relative humidity when the lid is in the closed position.

13. The storage device of claim 1, wherein the at least one container includes a first container having a first base and a second container having a second base, the at least one scale includes a first scale and a second scale, the first scale and the first base forming a first male-female connection when the first container rests on the first scale, and the second scale and the second base forming a second male-female connection when the second container rests on the second scale.

14. The storage device of claim 13, wherein the first male-female connection is different from the second male-female connection.

15. The storage device of claim 6, wherein at least one exhaust port is positioned to direct airflow into at least one container.

16. The storage device of claim 1 further comprising a gyroscopic sensor.

17. A storage and monitoring system comprising:
the storage device of claim 12;
an app operable on a mobile device and configured to operate and monitor the storage device, wherein the app is configured to operate the locking mechanism.

18. The storage and monitoring system of claim 17 wherein the app is configured to indicate a relative humidity measurement from the relative humidity sensor.

19. The storage and monitoring system of claim 17 wherein the app is configured to indicate a mass of the plant product in the at least one container.

20. The storage and monitoring system of claim 17 wherein the app is configured to indicate a relative temperature measurement from a relative temperature sensor.

21. The storage and monitoring system of claim 17 wherein the app is configured to indicate a relative movement of the storage device from a motion sensor.

22. A storage device for storing a plant product comprising:
a housing having a sidewall that defines an opening;
a lid coupled to the sidewall and movable to a closed position in which the opening is closed off, and the lid in cooperation with the sidewall define a storage space in the housing; and
at least one container that receives the plant product and that is removably received in the storage space,
wherein the at least one container has a body and a lid that is removably received on the body, the lid having an opening through which the plant product is inserted into the at least one container.

23. A storage device for storing a plant product comprising:
a housing having a sidewall that defines an opening;
a lid coupled to the sidewall and movable to a closed position in which the opening is closed off, and the lid in cooperation with the sidewall define a storage space in the housing;
at least one container that receives the plant product and that is removably received in the storage space; and
a fan in the housing for circulating air in the storage space,
wherein a partition wall separates the storage space from a compartment in which the fan is located, the partition wall including at least one inlet port and at least one exhaust port, and
wherein the fan is configured to circulate air from the storage space through the at least one inlet port and out of the at least one exhaust port.

24. A storage device for storing a plant product comprising:
a housing having a sidewall that defines an opening;
a lid coupled to the sidewall and movable to a closed position in which the opening is closed off, and the lid in cooperation with the sidewall define a storage space in the housing;
at least one container that receives the plant product and that is removably received in the storage space; and
a gyroscopic sensor.

* * * * *